US011059526B2

(12) United States Patent
Gallagher et al.

(10) Patent No.: US 11,059,526 B2
(45) Date of Patent: Jul. 13, 2021

(54) UTILITY VEHICLE CORNER MODULE WITH GATE SECURING APPARATUS

(71) Applicant: Aluminum Industries Investments Pty Ltd, Brighton (AU)

(72) Inventors: James Gallagher, Brighton (AU); Matthew Keen, Brighton (AU)

(73) Assignee: Aluminum Industries Investments Pty Ltd, Brighton (AU)

( * ) Notice: Subject to any disclaimer, the term of this patent is extended or adjusted under 35 U.S.C. 154(b) by 130 days.

(21) Appl. No.: 16/684,986

(22) Filed: Nov. 15, 2019

(65) Prior Publication Data

US 2020/0079441 A1   Mar. 12, 2020

Related U.S. Application Data

(63) Continuation of application No. PCT/AU2018/050475, filed on May 17, 2018.

(51) Int. Cl.
  *B62D 33/037*  (2006.01)
  *B62D 33/027*  (2006.01)
  *B62D 29/00*  (2006.01)

(52) U.S. Cl.
  CPC ......... *B62D 33/037* (2013.01); *B62D 33/027* (2013.01); *B62D 29/008* (2013.01)

(58) Field of Classification Search
  CPC ..................... B62D 33/0273; B62D 33/023; B62D 33/037; B62D 33/027
  USPC ......... 296/50, 51, 57.1, 58–60, 183.1, 186.4
  See application file for complete search history.

(56) References Cited

U.S. PATENT DOCUMENTS

| 4,778,213 | A | 10/1988 | Palmer |
| 5,806,907 | A | 9/1998 | Martinus et al. |
| 6,644,708 | B1* | 11/2003 | Grzegorzewski ......... B60P 1/43 296/10 |
| 9,592,860 | B1 | 3/2017 | Singer |

(Continued)

FOREIGN PATENT DOCUMENTS

| DE | 1580650 A1 | 12/1970 |
| EP | 3059145 A1 | 8/2016 |
| GB | 1230224 A | 4/1971 |

OTHER PUBLICATIONS

International Search Report, International Application No. PCT/AU2018/050475.

(Continued)

*Primary Examiner* — Gregory A Blankenship
(74) *Attorney, Agent, or Firm* — Richard A. Fagin

(57) ABSTRACT

A corner module (30, 32), including a first part adapted, in use, to join at an end of a first elongate and hinged gate of a utility vehicle tray, a second part adapted, in use, to join at an end of a second elongate and hinged gate of the utility vehicle tray, and a releasable gate securing apparatus including complementary engagement sections in the first part and in the second part, such that, in use, when the first and second gates are moved towards a closed position, the gates define a corner, and the releasable gate securing apparatus sections are enabled to engage to releasably retain the first and second parts in the closed position, wherein at least one of the first part and the second part has an outer face external to the corner in the closed position, wherein the outer face is curved, and wherein the defined corner is curved.

15 Claims, 25 Drawing Sheets

(56) References Cited

U.S. PATENT DOCUMENTS

| | | | |
|---|---|---|---|
| 2005/0275245 A1* | 12/2005 | Harrison | B62D 33/03 |
| | | | 296/186.4 |
| 2014/0183882 A1* | 7/2014 | Kaku | E05B 83/18 |
| | | | 292/281 |
| 2016/0200374 A1* | 7/2016 | Yamamoto | E05B 65/006 |
| | | | 292/100 |
| 2018/0079455 A1* | 3/2018 | Jaradi | B62D 33/0273 |
| 2020/0079439 A1* | 3/2020 | Stolfo | B62D 33/04 |
| 2020/0079441 A1* | 3/2020 | Gallagher | B62D 33/037 |
| 2021/0086843 A1* | 3/2021 | Ishii | E05C 9/006 |

OTHER PUBLICATIONS

Written Opinion, International Application No. PCT/AU2018/050475.

* cited by examiner

UTILITY VEHICLE CORNER MODULE WITH GATE SECURING APPARATUS

CROSS-REFERENCE TO RELATED APPLICATIONS

Continuation of International Application No. PCT/AU2018/050475 filed May 17, 2018. Priority is claimed from Australian application no. 2017901860 filed on May 17, 2017 and Australian application no. 2017901874 filed on May 17, 2017. All the foregoing applications are incorporated herein by reference.

BACKGROUND

The present invention relates to decks and tray decks for vehicles, and particularly relates to decks and tray decks for utility type vehicles. In particular, the present invention relates to a corner module that is able to be retro- or custom-fitted to vehicles, including conventional utility vehicles, trailers, gardening vehicles, carts and many other types of vehicle. The present invention may be particularly useful for conventional utility vehicles.

Utility vehicles, sometimes referred to as utes, pick-ups or pick-up trucks, typically are equipped with a tray or tray deck at the rear of the vehicle, which serves to carry loads of various types. The loads may include equipment, sand, gravel and various other kinds of items and materials.

Some utility vehicles have a flat area, which may be referred to as a tray, a cargo bed or a deck. Other utility vehicles have a flat area which is surrounded by up to four sides to form a container, which may also be referred to variously as a tray or a cargo bed. The sides may be fixed or movable, and may be a combination of fixed and movable sides. Sometimes the side at the back is referred to as a tail gate.

In this specification, for consistency and ease of understanding, the vehicle will be referred to as a utility or utility vehicle; the flat area will be referred to as a deck; each of the sides will be referred to as side gates (front, rear, left and right); and the deck and side gates together (whether there be one, two, three or four side gates) will be referred to as a tray deck.

In some utility vehicles, the sides of the tray deck are fixed in position, the deck and sides forming what is sometimes referred to as a tub. In other utility vehicles, one or more of the sides are movable between open and closed configurations. In this specification, unless otherwise indicated, the term side gate will refer to a side of a tray deck, wherein the side gate is movable at least between open and closed positions. Some utility vehicles have side gates which are detachable. Typically, if a utility vehicle tray deck has a front side (usually adjacent a cab of the utility vehicle), the front side is in a fixed position, and in this specification the front side may be referred to as a fixed side or also referred to as a side gate, though it will be understood that the front side is typically in a fixed position.

Typically, a deck or tray deck will be provided with a utility vehicle when sold to a customer. The type of tray deck is either dictated by the model of the vehicle or there may be a very limited range of options available from which a customer can select.

It is also possible to buy utility vehicles without a deck or tray deck fitted, and the customer can select a deck or tray deck for their vehicle after purchase, but the customer will have a very limited range of options for a deck or tray deck.

Further, decks and tray decks are typically manufactured or supplied as a single unit, and can be fitted only to one vehicle model or a very limited range of vehicle models. Such units are bulky, which causes them to be inconvenient and expensive to transport, for example, form a place of manufacture to a place where the deck or tray deck is to be fitted to a utility vehicle.

Many decks and tray decks are not configurable or may have very limited options for configuration. A customer may want to include various features to make a deck or tray deck more suitable for that customer's intended use of the utility vehicle.

As the objects loaded onto, and unloaded from, utility vehicles tend to be large and heavy, and the frequency of loading and unloading such objects from the vehicle is high, the design of utility vehicles must be such that makes loading and unloading of such objects as easy as possible.

Accordingly, the design of the utility vehicle, and the material of its construction, should be able to withstand the harsh conditions that such vehicles are often subjected to, for example, knocking, exposure to outdoor conditions/weather and frequent loading and unloading of large and heavy objects.

In order to achieve a sturdy design and construction, the tray deck and side walls and/or gates of utility vehicle trays, are typically fabricated from aluminium-alloy systems that are tough and have a high resistance to corrosion and are therefore able to withstand rain, sunlight and the harsh outdoor environment. As aluminium-alloy systems are lineally extruded, it is difficult to fabricate this material so as to form curved or rounded corners. Accordingly, the tray corners, along with tray deck corners and side wall and/or gate corners, of conventional utility vehicles tend to be straight edged corners. It will be appreciated that straight edged or sharp tray and/or tray deck corners are not only generally considered by consumers to have low aesthetic quality and visual appeal, but the sharp edges can also present safety issues.

Many utility vehicles have foldable (or collapsible) and removable gates mounted at or near the rear and left/right sides of the tray deck. Such collapsible/removable gates in the tray design assists in increasing the ease with which large and heavy objects may be loaded and unloaded from the vehicle, as the requirement to lift such objects over the fixed rear and left/right side walls of a tray is avoided. Large and heavy objects may also be loaded onto the tray deck by sliding motion when one or more of the gates are in the collapsed position or are removed.

However, whilst the removable and/or collapsible design of the rear and left/right gates of the tray increases the ease with which objects may be loaded and unloaded onto the tray deck of the utility vehicle, such design restricts the ability to locate features such as light fittings at the rear of the vehicle. In this regard, in order to accommodate the removable or collapsible rear and left/right gates, light fittings, such as brake and indicator lights, must be located below the tray or tray deck which results in an unappealing design with low aesthetic quality. This design is also suboptimal from a safety view point as the lower positioning of the light fittings at the rear of the vehicle results in reduced visibility of the brake and indicator lights by passengers of other vehicles travelling behind the utility vehicle when the utility vehicle is on the road.

Some utility vehicles incorporate light fittings into a rear corner of each side wall of the tray, however, in order to accommodate the light fittings, the left/right side walls, and sometimes also the rear side wall, are in a fixed position, and cannot be removed or collapsed (as can gates) to increase the ease with which objects are loaded on to and unloaded from the tray deck. Sometimes such vehicles may be provided with only a rear gate which is removable and/or collapsible, and which does not contain a light fitting.

It is an object of the present invention to overcome, or at least ameliorate, at least one of the above-mentioned problems in the prior art, and/or to overcome, or at least ameliorate, at least one problem in the prior art, which has not been mentioned above and/or to provide at least a useful alternative to prior art devices, systems and/or methods.

SUMMARY OF THE INVENTION

In one aspect, the present invention provides a corner module, including a first part adapted, in use, to join at an end of a first elongate and hinged gate of a utility vehicle tray, a second part adapted, in use, to join at an end of a second elongate and hinged gate of the utility vehicle tray, and a releasable closure retention mechanism including complementary engagement sections in the first part and in the second part, such that, in use, when the first and second gates are moved towards a closed position, the gates define a corner, and the closure retention mechanism sections are enabled to engage to releasably retain the first and second parts in the closed position, wherein at least one of the first part and the second part has an outer face external to the corner in the closed position, wherein the outer face is curved, and wherein the defined corner is curved.

SUMMARY OF SOME OPTIONAL EMBODIMENTS OF THE INVENTION

In embodiments, the outer face of each of the first and second parts is curved with respect to at least one plane.

In other embodiments, the outer face of the first part is curved with respect to at least one plane, and the outer face of the second part is curved with respect to at least two planes. In an alternative embodiment, the outer face of the second part is curved with respect to at least one plane, and the outer face of the first part is curved with respect to at least two planes.

In yet other embodiments, the outer face of the first and second parts is curved with respect to at least two planes. In some such embodiments, the planes are substantially orthogonal to each other.

The curvature in the first and second parts results in a utility vehicle tray having rounded edges when the first and second parts are in the closed position. It will be appreciated that rounded edges present a safer alternative to straight edged utility vehicle trays as sharp edges are avoided. As consumers also tend to view articles having smoother lines and curved edges as having greater aesthetic appeal than articles with straight or sharp edged profiles, the corner module of the present invention is also expected to result in utility vehicles having a greater aesthetic appeal.

In some embodiments, the outer face of the first part is curved so as to match or substantially match curvature of the first gate in at least one plane. In some other embodiments, the outer face of the second part is curved so as to match or substantially match curvature of the second gate in at least one plane.

In embodiments, the first and second gates each have a planar side which is inwardly facing when in the closed position.

In other embodiments, the first and second gates are substantially orthogonal to each other in the closed position.

In other embodiments, the gates may not be substantially orthogonal to each other in the closed position, and each corner module is adapted for gates in this configuration, such that the internal angle of each corner module is either substantially greater or substantially lesser than 90°.

In embodiments, either one, or both, of the first part and the second part include at least one part of a light unit. In one alternative of this embodiment, the first part has an inner face internal of the corner module when in the closed position, wherein at least a portion of the outer face of the first part is sufficiently distant from the inner face to provide a gap, such that the gap enables the first part to contain at least a portion of the light unit embedded in the first part. In another alternative of this embodiment, the second part has an inner face internal of the corner when in the closed position, wherein at least a portion of the outer face of the second part is sufficiently distant from the inner face, such that a gap in the outer face enables the second part to contain at least a portion of the light unit embedded in the second part. In yet another alternative of this embodiment, each of the first part and the second part have an inner face internal of the corner module when in the closed position, wherein at least a portion of the outer face of each of the first part and the second part is sufficiently distant from the respective inner face of each of the first part and the second part to provide gaps, such that each gap enable each of the first part and the second part to contain at least a portion of each respective at least one part of the light unit embedded in the first part and the second part.

It will be appreciated that the ability to embed at least part of the light unit in either the first or second parts, or both parts of the corner module, allows lights, such as brake or indicator lights, to be fitted substantially near the corners of the utility vehicle as opposed to below the tray or tray deck. This not only provides for greater aesthetic appeal, but also results in greater visibility of the lights by passengers of other vehicles travelling behind the utility vehicle when driving on the road.

It will be further appreciated that the ability to embed at least part of the light unit in either the first or second parts, or both parts of the corner module, whilst also allowing for all gates, including left/right and rear gates, to be removable and/or collapsible, provides for both safety and convenience for the utility vehicle.

It will be yet further appreciated that the curvature of the first and second parts allows for forming the gaps into which at least a portion of the light unit, or respective parts of the light unit are embedded.

In yet other embodiments, the closure retention mechanism including complementary engagement sections includes a complementary latch and latch engagement (or latch receiver or latch retainer) means. In one alternative of this embodiment, the latch means is on the first part, and the latch engagement (or latch receiver or latch retainer) means is on the second part. In another alternative of this embodiment, the latch means is on the second part, and the latch engagement (or latch receiver or latch retainer) means is on the first part.

In further embodiments, the corner module further includes a third part which, in use, is adjacent and below the first part and second part when in the closed position, and forming a tray corner of the utility vehicle tray. In an embodiment, the third part has an outer face which, in use, is external to the tray corner, and wherein the outer face is curved with respect to at least two planes.

In yet further embodiments, the corner module further includes a support post, wherein, in use, the first part is adapted to releasably engage with the support post when the first gate is in the closed position. In other embodiments, the corner module includes a support post, wherein, in use, the second part is adapted to releasably engage with the support post when the second gate is in the closed position. In further embodiments, the corner module includes a support post, wherein, in use, the second part and the first part are each adapted to releasably engage with the support post when the first part or the second gate is in the closed position. In yet another embodiment, at least a part of the post is anchored into the third part.

It will be appreciated that a support post may provide increased strength to a respective corner module In embodiments, where the second part includes a corner-most section of the corner module, the second part may further include a removable outer face piece comprising the corner-most section in the closed position. The second part removable outer face piece may snap fit to the second part. In alternative embodiments, where the first part includes a corner-most section of the corner module, the first part may further include a removable outer face piece comprising the corner-most section in the closed position. The first part removable outer face piece may snap fit to the first part. In yet other alternative embodiments, where both the first and second parts meet to cooperatively form a corner-most section of the corner module, both the first and second parts may each further include a removable outer face piece, the outer face pieces, in the closed position, together comprising the corner-most section.

In other embodiments, the third part further includes a removable outer face piece including a corner-most section of the corner module. The third part removable outer face piece may snap fit to the third part.

It will be appreciated that the first part removable outer face piece, the second part removable outer face piece, and/or the third part removable outer face piece may form sacrificial covers, which can be removed and replaced if damaged, for example, in an accident. This allows for maintaining an aesthetically pleasing appearance for the utility vehicle.

In further embodiments, one or more of the first part, the second part, the third part, the first part removable outer face piece, the second part removable outer face piece, and the third part removable outer face piece are fabricated from plastic, or include at least a portion formed from plastic. In some embodiments, the plastic may be extrusion moulded. It will be appreciated that forming the first, second and third parts and/or outer face pieces of those parts from plastic allows for greater ease of manufacture, particularly compared with aluminium or aluminium-alloy extrusion. Further, using plastic may reduce costs for manufacturing a utility tray, even if other parts of the tray are formed from aluminium or aluminium-alloy, or other materials more expensive than plastic.

In other embodiments, one or more of the first part, the second part, the third part, the first part removable outer face piece, the second part removable outer face piece, and the third part removable outer face piece are fabricated from metal, or include at least a portion formed from metal. In some embodiments, the metal may be punched or pressed into a desired shape.

In some embodiments, the first gate comprises a rear gate of the utility vehicle tray, and the second gate comprises either a left or right gate of the utility vehicle tray. Alternatively, in some embodiments, the second gate comprises a rear gate of the utility vehicle tray, and the first gate comprises either a left or right gate of the utility vehicle tray.

In this specification, unless context requires otherwise, a reference to a right gate, including features and/or functions thereof, will apply mutatis mutandis to a left gate, including features and/or functions thereof, and vice versa. Further, in this specification, unless context requires otherwise, a reference to a right corner module, including features and/or functions thereof, will apply mutatis mutandis to a left corner module, including features and/or functions thereof, and vice versa.

In this specification, a reference to a utility vehicle tray, utility tray or tray will be understood to include, unless context requires otherwise, a reference to a number of components operating together, including, but not limited to: the tray deck on to which is placed one or more objects for transportation; the left/right and rear gates; and the left/right corner modules, which comprise corners formed by closure of the left/right and rear gates, the left/right corner modules each including respective first and second parts.

In other embodiments, the tray may include left/right and rear panels depending from the tray deck, with two third parts of the respective left/right corner modules, each adapted as required, to form left/right corners for the panels, respectively, in the left/right corner modules. In some embodiments, the third part may be configured so as to serve as either a left or right corner module third part, by having reflectional symmetry.

In yet other embodiments, the tray may include a fixed front wall, which is configured so as to form, in cooperation with the tray deck and left/right and rear gates (when closed), a box. The box may be configured so as to prevent or ameliorate leaking of substances such as sand or fine dirt particles when closed.

In further embodiments, the tray may include a roll bar positioned at or towards a front part of the tray. The roll bar may be configured so as to be higher in some parts thereof than the roof of the cab of the utility vehicle.

In some embodiments, the left/right and rear gates are hinged, each at a number of positions, to allow for moving each respective gate between open and closed configurations. In other embodiments, the hinge may extend substantially the entire length of the respective gate, which may provide for a more robust hinging mechanism.

In yet other embodiments, the hinge mechanism for the left/right and/or rear gates may also incorporate means for allowing detachment of the respective gate from the tray or tray deck. In a configuration where, for example, the tray is used without the rear gate (either removed or remaining in the open position), the left/right support posts of the left/right corner modules may provide additional support to the raised or closed left/right gates.

In embodiments including light units in the corner modules and including removable gates, means to deliver power and/or signals to the light units will be disconnectable and connectable to allow for, respectively, detachment and attachment (or reattachment) of the gates. In some embodiments, the means to deliver power and/or signals to the light units is one or more electrical cables with plug(s) positioned at a point along each cable as required to enable the disconnection and connection/reconnection of the means.

In embodiments, the corner module includes gate securing apparatus for releasably securing a first gate and a second gate orthogonally positioned with respect to each other, the gate securing apparatus including on the first gate a first engagement part, on the second gate, a reciprocating carriage including a second engagement part, wherein, when the carriage moves in a first carriage direction, the second engagement part engages with the first engagement part, and when the carriage moves in a second carriage direction, the second engagement part disengages from the first engagement part, a hinged latch handle operably connected to the reciprocating carriage by a lever mechanism, such that when the hinged latch handle is moved in a first handle direction, the reciprocating carriage is caused to move in the first carriage direction, and when the hinged latch handle is moved in a second handle direction, the reciprocating carriage is caused to move in the second carriage direction.

In embodiments, the present invention provides a method for releasably securing a first gate and a second gate orthogonally positioned with respect to each other, the method including providing on the first gate a first engagement part, and providing on the second gate a second engagement part, on the second gate, moving a hinged latch handle in a first handle direction to cause a carriage, having the second engagement part and operably connected to the hinged latch handle, to move in a first carriage direction, wherein moving the carriage in a first carriage direction causes the second engagement part on the carriage to either engage with the first engagement part on the second gate.

In some embodiments, the first engagement part is an open slot and the second engagement part is a pin. In embodiments, the open slot has an opening at one end and the pin is configured to be able to slide into and out of the open slot through the opening.

In embodiments, the open slot is located at or towards an end of the first gate. In other embodiments, the reciprocating carriage, pin, and hinged latch handle are located at or towards and end of the second gate. It will be appreciated that the designation of first gate and second gate is relative, and in any arrangement of two orthogonal gates, either gate could be designated first or second.

In other embodiments, when the pin engages with the open slot, the first and second gates are secured in a closed position. In such embodiments, when the pin sufficiently disengages from the open slot, the first gate and the second gate are released from each other. It will be appreciated that when the gates are released from each other, each gate may be opened if that gate is not otherwise secured at, for example, another end of the gate.

In embodiments, moving the hinged latch handle in the first handle direction causes the hinge angle to decrease. Conversely, moving the hinged latch handle in the second handle direction causes the hinge angle to increase.

In other embodiments, the first carriage direction is away from the hinge of the, and the second carriage direction is towards the hinge.

In yet other embodiments, the open slot is open at an end away from the hinge, such that the second carriage direction moves the pin towards the open end of the open slot and/or out of the open end of the open slot, and such that the first carriage direction moves the pin into the open end of the open slot and/or towards the closed end of the open slot.

In further embodiments, the pin protrudes from the carriage orthogonally with respect to the reciprocating directions of movement of the carriage, and a notional plane of a slotted face of the open slot, when positioned for releasing or securing operation with the pin, is orthogonal with respect to the reciprocating directions of movement of the pin.

In yet further embodiments, the lever mechanism includes a substantially elongate lever arm hingedly connected at one end to the hinged latch handle, and hingedly connected at the other end to the reciprocating carriage, such that, when the hinged latch handle is moved in a second handle direction, the hinge angle between the hinged latch handle and the lever arm increases and the hinge angle between the reciprocating carriage and the lever arm increases, causing the reciprocating carriage to move in the second carriage direction. Conversely, when the hinged latch handle is moved in a first handle direction, the hinge angle between the hinged latch handle and the lever arm decreases and the hinge angle between the reciprocating carriage and the lever arm decreases, causing the reciprocating carriage to move in the first carriage direction.

In embodiments, the gate securing apparatus includes a bias means. In some such embodiments, the bias means biases the gate securing apparatus to the secured position. In embodiments, the bias means biases the reciprocating carriage towards the first carriage direction. In embodiments, the bias means is a coil spring. In some such embodiments, the coil spring is coaxial with the hinge of the hinged latch handle and is configured to bias the hinged latch handle to bias the reciprocating carriage towards the first carriage direction.

In yet further embodiments, the gate securing apparatus includes a detent means, such that when the reciprocating carriage moves sufficiently in the second carriage direction, the detent means operates to retain the reciprocating carriage against the bias in a position at or towards the end of travel in the second carriage direction. In further embodiments, the detent means releases the reciprocating carriage when sufficient force is applied to move the reciprocating carriage in the first carriage direction.

In embodiments, the detent means includes a detent pin located in a slot through which the reciprocating carriage moves, and a lug on a detent biasing means located on the reciprocating carriage, wherein the detent pin engages with a first portion of the lug when the reciprocating carriage moves in the second carriage direction such that the detent biasing means is moved opposite its direction of bias, and when the reciprocating carriage moves sufficiently far in the second carriage direction, the detent pin engages with a second portion of the lug allowing the detent biasing means to move towards its direction of bias, such that the detent means is engaged to retain the reciprocating carriage in a position at or towards the end of travel in the second carriage direction. In some embodiments, the detent biasing means is a leaf spring.

In various embodiments, the gate securing apparatus includes moulded covers substantially encapsulating the carriage, the pin, the biasing means, the detent means, and the open slot, when the gates are in a closed configuration.

BRIEF DESCRIPTION OF THE DRAWINGS

At least one embodiment of the invention will be described with reference to the following, non-limiting illustrations representing the at least one embodiment of the present invention, in which.

DETAILED DESCRIPTION OF SOME EMBODIMENTS

It will be understood that, in describing these embodiments of the invention, references to left (and/or left side) and right (and/or right side) are made with respect to a view of a utility vehicle from the rear of the vehicle. Further, reference to inside or inner side is with respect to the side of the utility tray gates that are inwardly facing when the gates are in the closed position, and reference to outside or outer side is with respect to the side of the utility tray gates that are outwardly facing when the gates are in the closed position.

It will also be understood that, in describing these embodiments of the invention, reference to the rear gate of the utility vehicle tray will be a reference to the first elongate and hinged gate of the utility vehicle tray, and reference to the left and/or the right gate of the utility vehicle tray will be a reference to the second elongate and hinged gate of the utility vehicle tray. However, it will be appreciated that the feature of the first and second elongate and hinged gates of the utility vehicle tray as claimed could, in other embodiments, be fulfilled by other gate configurations.

In describing these embodiments of the corner module, there is a focus on a right or right-side corner module in the tray of a utility vehicle. However, it will be understood that the same features and functions will apply mutatis mutandis to the left or left-side corner module. Further, it will be understood that in other possible embodiments, a corner module could be located at or towards the front of a vehicle, or at or toward the side of a vehicle.

Figure 1:
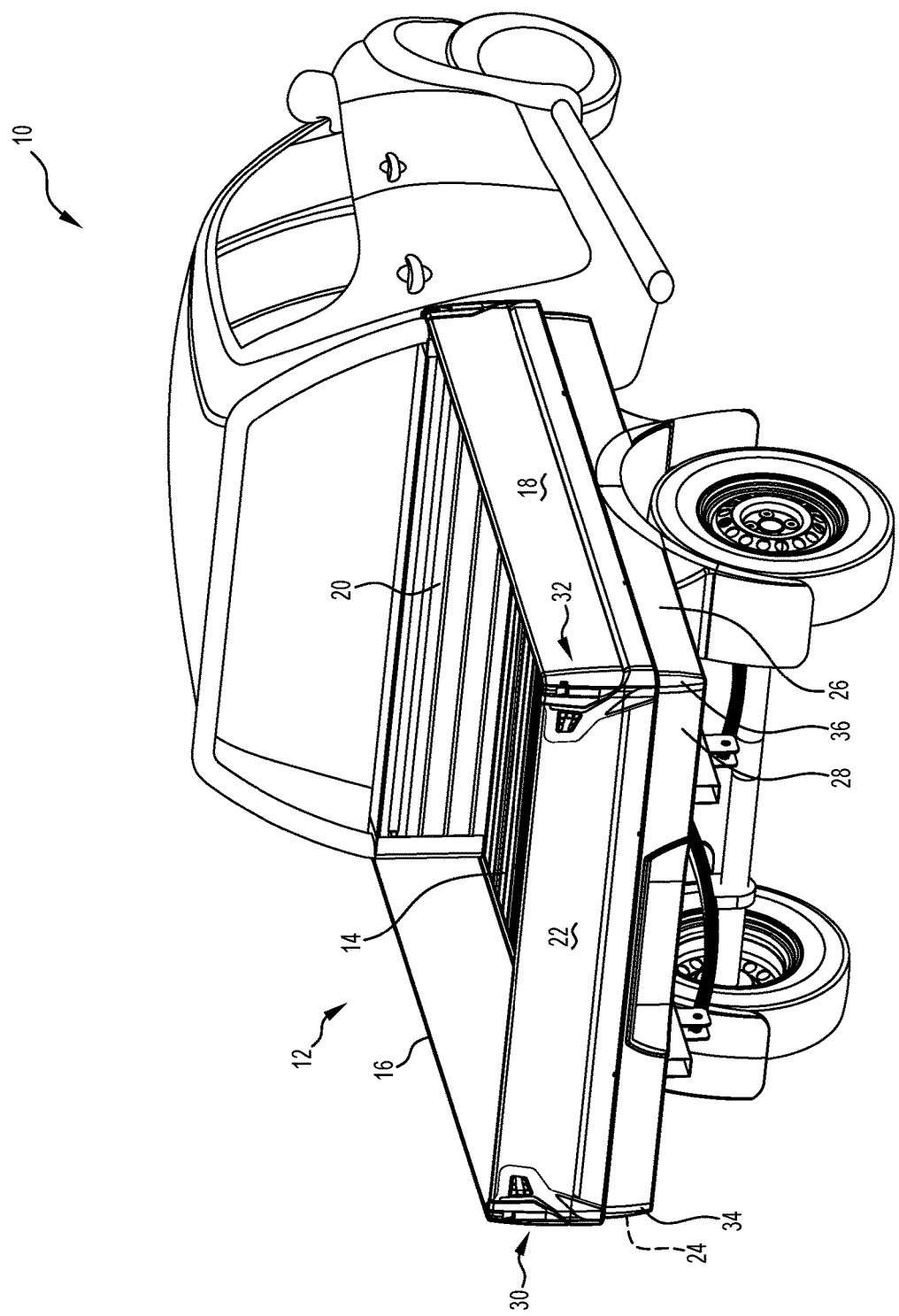
FIG. 1 is a rear perspective view of a utility vehicle having a utility tray including left and right corner modules in accordance with an embodiment of the invention.

FIG. 1 shows a vehicle (utility vehicle) 10 having a utility tray 12, which includes a utility tray deck 14 for carrying loads. The tray deck 14 is substantially planar and is intended for supporting various configurations of items in a load, and also supports loads comprising particulate and/or granular materials, such as sand, pebbles, and gravel.

The utility tray 12 includes a left 16 and a right gate 18 (each of which comprise a second gate with reference to the respective left/right corner modules). The utility tray 12 also includes a front wall 20, which is in a fixed position, and a rear gate 22 (which comprises a first gate with respect to each corner module). It will be understood that designating either the right or left gates as the second gate, and designating the rear gate as the first gate is not intended to be limiting, and that an alternative description of the present invention could designate either the left or right gates as the first gate(s) and the rear gate as the second gate.

In the embodiment shown in FIG. 1, the utility tray 12 includes tray deck panels, including a left side panel 24 (not shown in FIG. 1), a right-side panel 26 and a rear panel 28. The panels may be friction fitted to the tray 12 or tray deck 14, or could be attached with means such as screws.

The utility tray 12 also includes a left corner module 30 and a right corner module 32. The left corner module 30 includes a third part 34, which comprises a corner between the left side panel 24 and the rear panel 28. The right corner module includes a third part, which comprises a corner between the right-side panel 26 and the rear panel 28.

Figure 2:
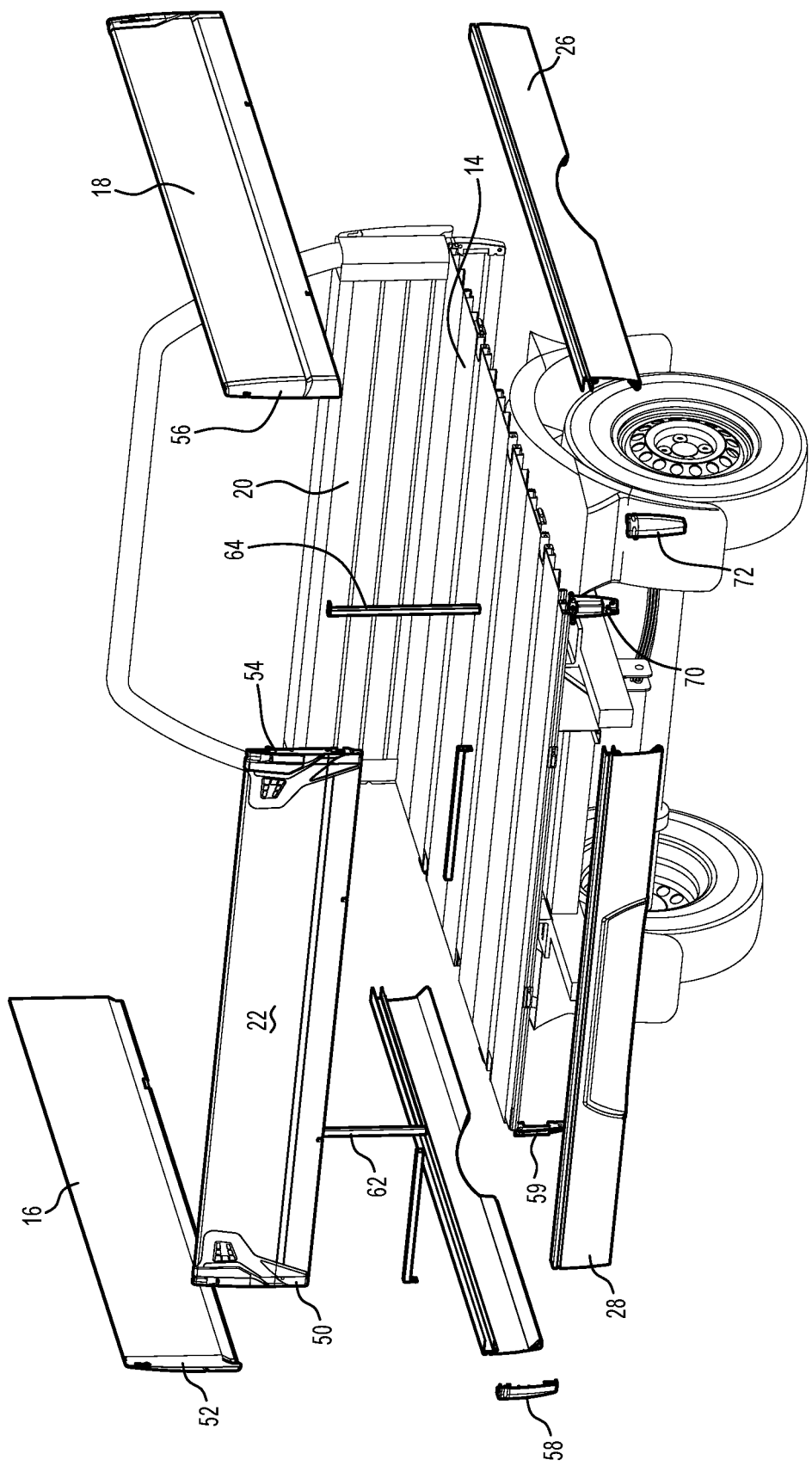
FIG. 2 is an exploded rear perspective view of the utility tray, similar to that shown in FIG. 1 in accordance with an embodiment of the present invention.

FIG. 2 is an exploded view of the utility tray 12 from FIG. 1. In FIG. 2, the left side panel 24 is more clearly shown.

Also shown in FIG. 2 is the left corner module first part 50 and the left corner module second part 52, respectively joined at an end of the left gate 16 and the rear gate 22. There is also shown the right corner module first part 54 and right corner module second part 56, respectively joined at an end of the right gate 18 and the rear gate 22.

FIG. 2 also shows two parts 58 of the left corner module third part 34 and two parts 60 of the right corner module third part 36.

In this embodiment, the corner modules each include a support post, shown in FIG. 2 as the left corner post 62 and the right corner post 64. Each corner post is removably located in a respective slot formed in the left and right corner module third parts. Each support post 62, 64 can be fitted for its respective corner module, or removed, as desired. The support post may provide additional strength for one or more of the first and second gates, when in a closed position. For example, if it is desired to use the utility vehicle tray 12 without the rear gate 22, the gate can be lowered or removed, and the corner posts inserted so as to provide additional support for the left and right gates 16, 18. The corner modules 30, 32 may also be configured so that when each of the left, right and rear gates 16, 18 and 22 are in closed position, the support posts 62, 64 provide additional support and/or strength for the respective corner modules 30, 32 and the respective gates 16, 18, 22. The additional support and/or strength may be desirable where a load in the utility tray 12 is likely to cause additional force to bear against the first and second gates, and against the corner module. In one example, the load may be a pile of sand, which when loaded onto the utility tray, spreads out and rests against each of the left, right and rear gates.

In other embodiments, the posts 62, 64 may be fixed into the corner module. In yet other embodiments, the posts may comprise ends of an arched member, which could also be used, for example, as a support for a tray cover.

Figure 3:
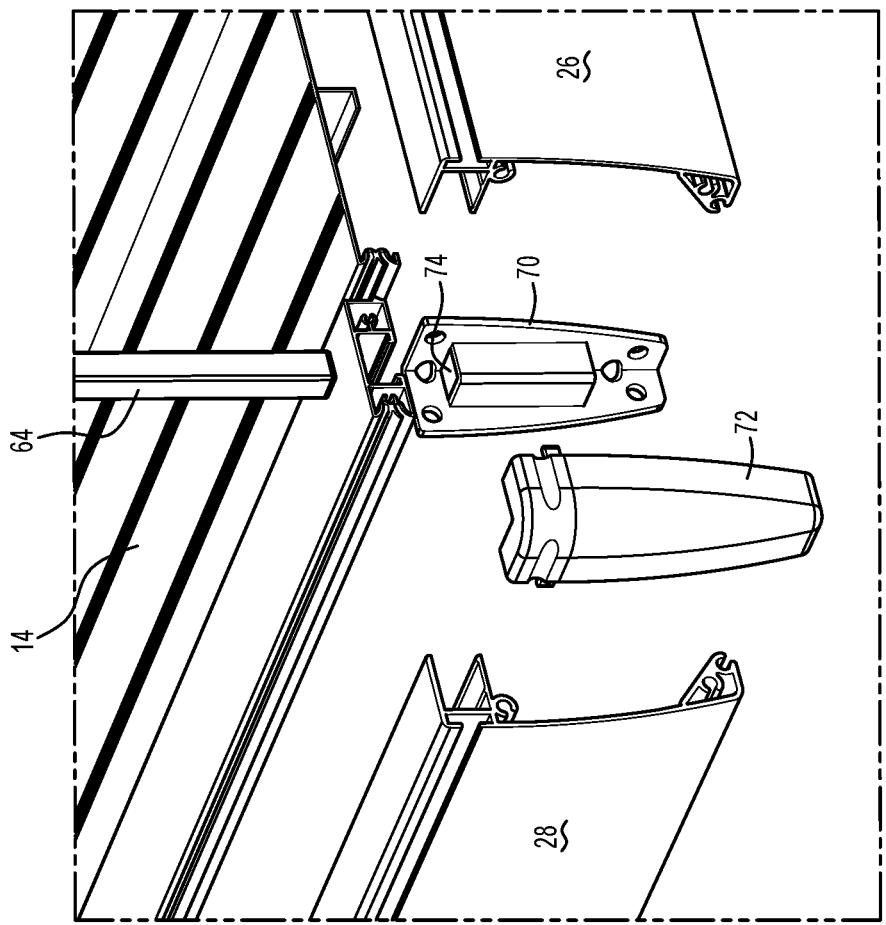
FIG. 3 is a detailed exploded perspective view of a lower portion of a right corner module in accordance with an embodiment of the present invention showing features of the third part of the corner module in accordance with an embodiment of the present invention.

FIG. 3 shows a detail of a lower part of the right corner module 32, wherein the two parts 60 of the third part 36 are depicted. One part is the bracket 70, the other part is the outer piece 72, which may further include a sacrificial cover.

The bracket 70 includes a channel 74, which is shaped to accept the right corner module support post 64. As can be seen in FIG. 3, in this embodiment, the right corner module post 64 has a square cross-sectional shape, and so the channel 74 also has a square cross-sectional shape.

The outer piece 72 is configured so as to snugly fit to the bracket 70 and into respective parts of the right panel 26 and rear panel 28.

Figure 4:
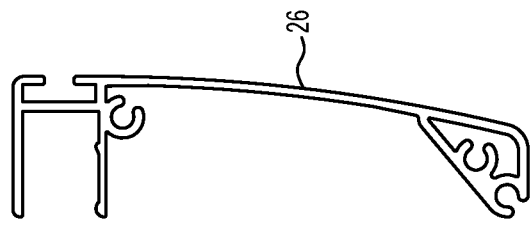
FIG. 4 is a side cross-sectional view of a utility tray deck right-side panel in accordance with an embodiment of the present invention.

FIG. 4 is a side cross-sectional view of the right panel 26, in which it can be seen that there are channels for receiving respective parts of the outer piece 72 (protruding lugs) to retain the outer piece in place or to guide placement of the outer piece when positioning the outer piece into the corner module 36.

Figure 5:
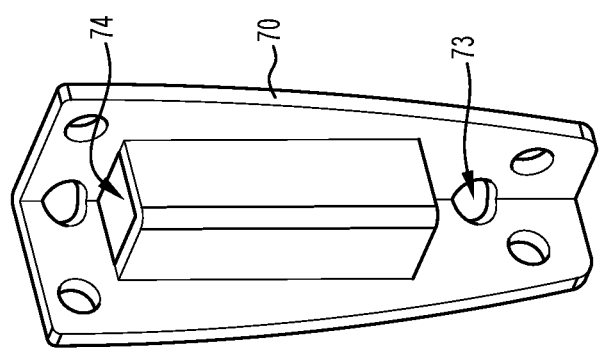
FIG. 5 is a perspective view of an internal section of the third part of a corner module in accordance with an embodiment of the invention.

FIG. 5 shows a more detailed view of the right corner module third part bracket 70 and its square cross-sectional shaped channels 74. FIG. 5 also shows in more detail a hole 73 configured to receive a fastening means, such as a screw, for securing the outer piece 74.

Figure 6B:
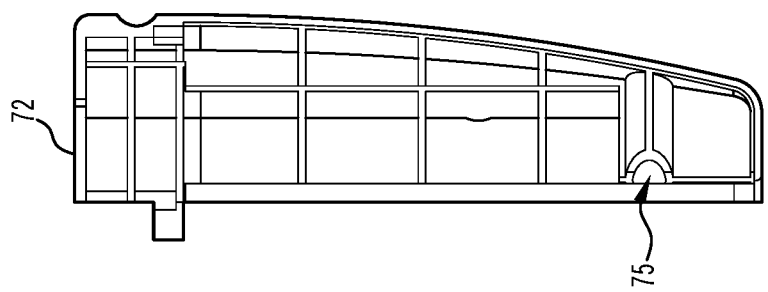
FIG. 6b is a side cross-sectional view of the third part removable outer face piece as shown in FIG. 6a in accordance with an embodiment of the present invention.
Figure 6A:
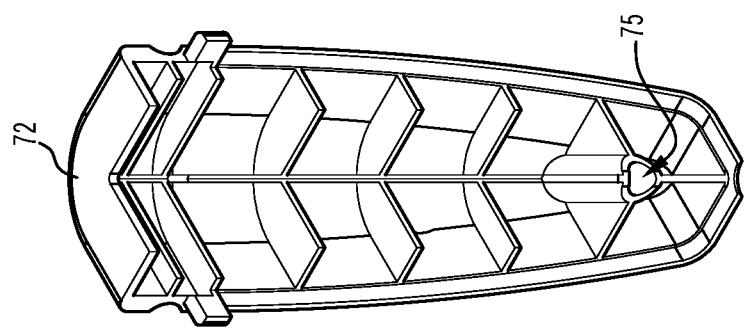
FIG. 6a is an inside perspective view of a third part removable outer face piece in accordance with an embodiment of the present invention.

FIGS. 6a and 6b show details of the outer piece 74 including a bore 75, complementary to the hole 73 in the bracket 70, configured to receive the fastening means, such as a screw, for securing the outer piece 74 in place.

Figure 7:
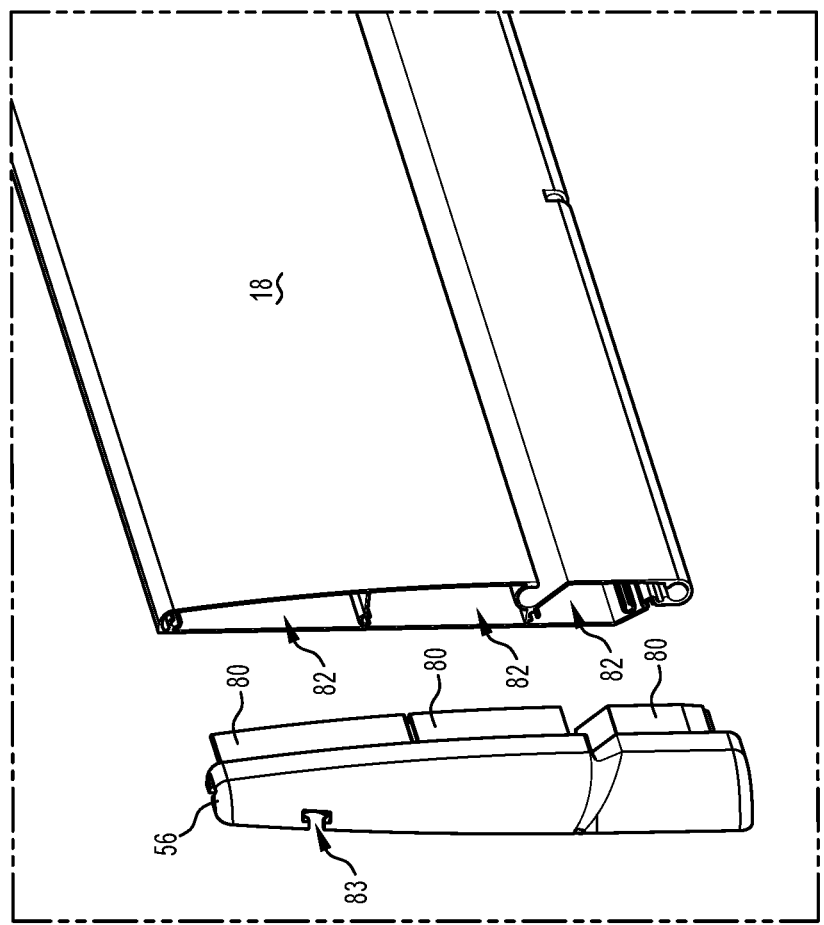
FIG. 7 is a rear perspective view of the utility tray right gate (in this embodiment, comprising a second gate), along with a second part of a right corner module in accordance with an embodiment of the present invention.

FIG. 7 shows an example embodiment of a second part 56 for the right corner module 32, and means for joining same to the rear end of the second (right) gate 18. The second part 56 includes projections 80 and the second gate 18 includes holes 82, such that the projections are configured to snuggly fit into the holes to retain the second part 56 as joined to the second gate 18. In embodiments, the projections and holes may be sufficiently snuggly fit so as to not require further means for securing the same together. However, it will be appreciated that in other embodiments further securing means could be used, such as adhesive, rivets, screws or other securing means.

The second part 56 also includes a latch receiver 83, which form one of the complementary engagement sections of a closure retention mechanism (shown in further Figures).

Figure 8:
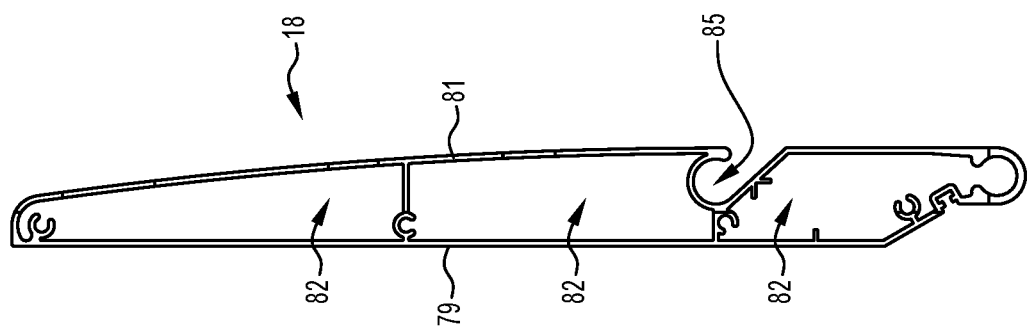
FIG. 8 is a side cross-sectional view from a rear perspective of the right gate shown in FIG. 7 in accordance with an embodiment of the present invention.

FIG. 8 is a side cross-sectional view from a rear perspective of the second gate 18. It will be appreciated that the shape of the gate is made substantially more aesthetically pleasing by providing a curved outer face 81, whilst the inner face 79 is substantially planar, which is practical for carrying certain loads in the utility tray 12.

Further, FIG. 8 shows a channel 85 towards a lower part of the outer face 81 of the second (right) gate 18. The channel 85 may be used for securing hooks or other similar implements when using a hook and strap mechanism for securing loads in the utility tray 12 or on the utility tray deck 14.

Figure 11:
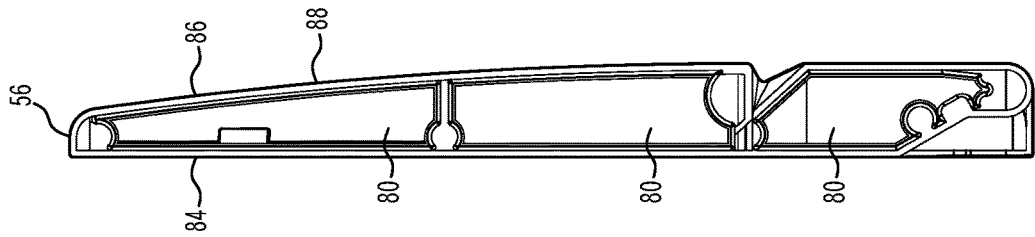
FIG. 11 is a side cross-sectional view from a front perspective of the second part from the right-side corner module depicted in FIG. 7 in accordance with an embodiment of the present invention.
Figure 10:
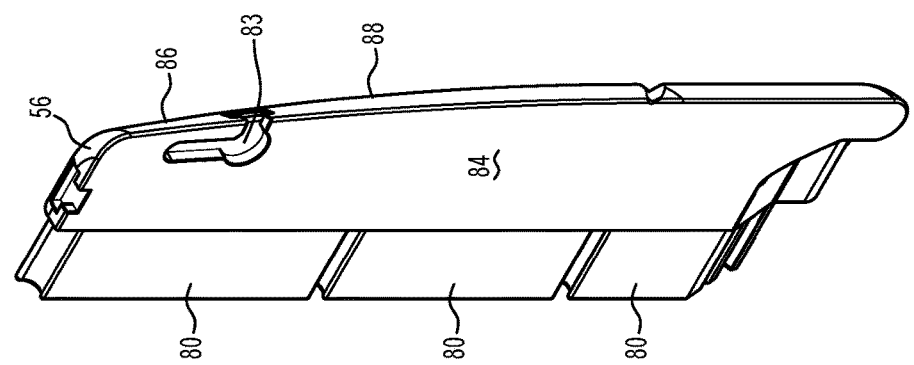
FIG. 10 is a rear-left-side perspective view of the second part from the right-side corner module depicted in FIG. 7 in accordance with an embodiment of the present invention.
Figure 9:
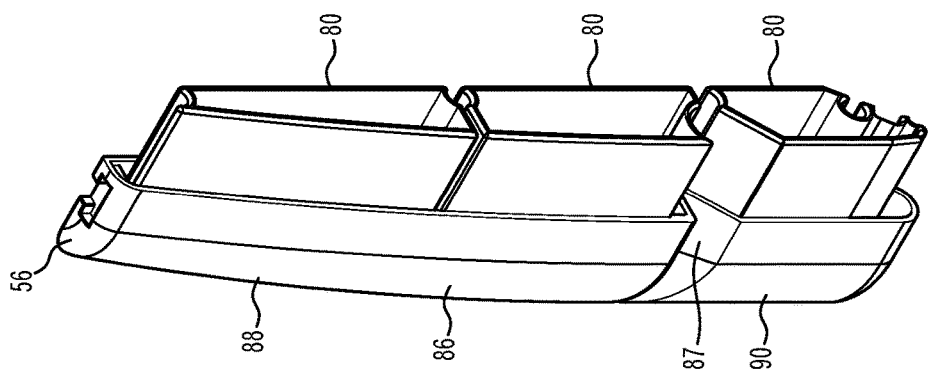
FIG. 9 is a front-right-side perspective view of the second part from the right-side corner module depicted in FIG. 7 in accordance with an embodiment of the present invention.

FIGS. 9, 10 and 11 show details of the second part 56 for the right corner module 32 from different perspectives. The second part 56 has an inner surface 84 and an outer surface 86 with respect to the corner of the utility tray 12, when the gates 16, 18 and 22 of the utility tray are in a closed position. The outer surface 86 has a curvature 88 with respect to a vertical plane, which matches the curvature of the outer surface 81 of the second gate (right gate) 18. It can also be seen, perhaps most clearly in FIG. 9, that the second part 56 has a curvature 90 with respect to a horizontal plane on the outer surface 86. It will be appreciated that the curvature 90 is configured to provide a rounded corner appearance in the corner module 32 between the second gate (right gate) 18 and the first gate (rear gate) 22.

Figure 12:
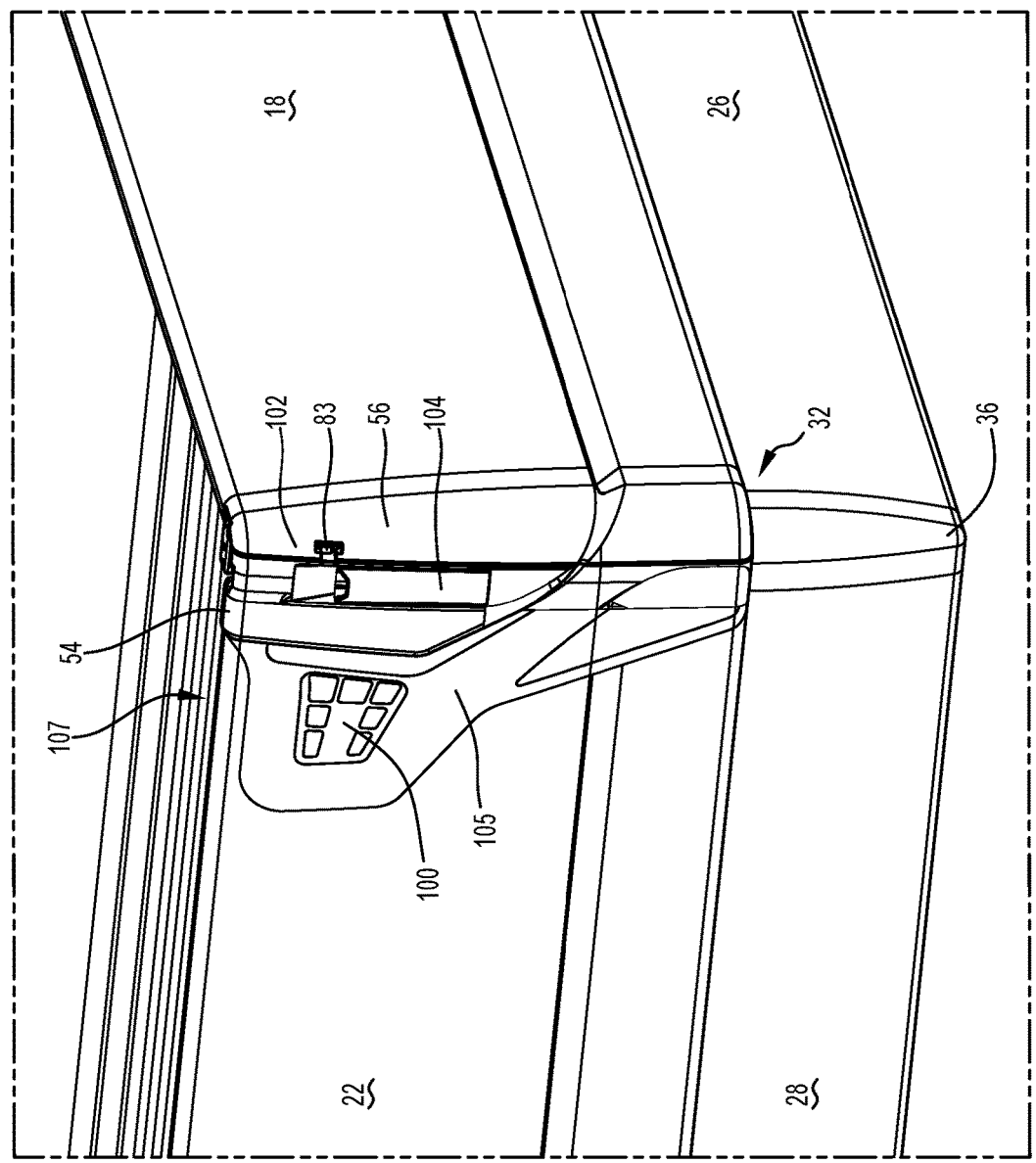
FIG. 12 is a rear-right-side perspective view of the right-side corner module in accordance with an embodiment of the present invention.

FIG. 12 shows a rear-right-side perspective view of the right corner module 32, which is shown in the closed position. More clearly seen in FIG. 12 are the features of a light unit cover 100, which is located in the right corner module 32 first part 54, and the closure retention mechanism 102, including a latch protrusion 103, a latch handle 104 and a latch receiver 83.

The latch protrusion 103 and latch handle 104 are some of the complementary engagement sections of the closure retention mechanism 102 located in the first part 54 and the latch receiver 83 is the complementary engagement section of the closure retention mechanism 102 located in the second part 56.

The closure retention mechanism 102 is configured so that, when closing the gates and the corner module, the right (second) gate 18 is moved to the upright-most position, and then the first (rear) gate 22 is moved towards the upright-most position, wherein the latch protrusion 103 engages with and into the latch receiver 83 and then slides into an upper part of the latch receiver 83. When desiring to open the corner module 32, the latch handle 104 is pulled upwardly, which causes the latch protrusion 103 to move to an upper part of the latch receiver 83, then allowing the latch protrusion 103 to disengage from the latch receiver 83 and the rear (first) gate 22 can be lowered.

It will be appreciated that the light unit cover 100 may be configured to include one or more lights for different functions such as indicators, brake lights or rear parking lights. In other embodiments of the corner module, where the utility tray 12 is located at or towards a front part of a vehicle 10, the light cover unit could incorporate facilities for a head light.

It will also be appreciated that the curvature in the first part 54 of the corner module 32 creates a space between an outer surface 105 and an inner surface 107 (not shown in FIG. 12) of the first part 54, or may also form a space between the outer surface 105 of the first part 54 and an inner surface of the first gate 22. The space between the outer surface 105 and the inner surface 107 (or inner surface of the gate 22) allows for a light unit to be fitted behind the light cover 100.

Figure 13:
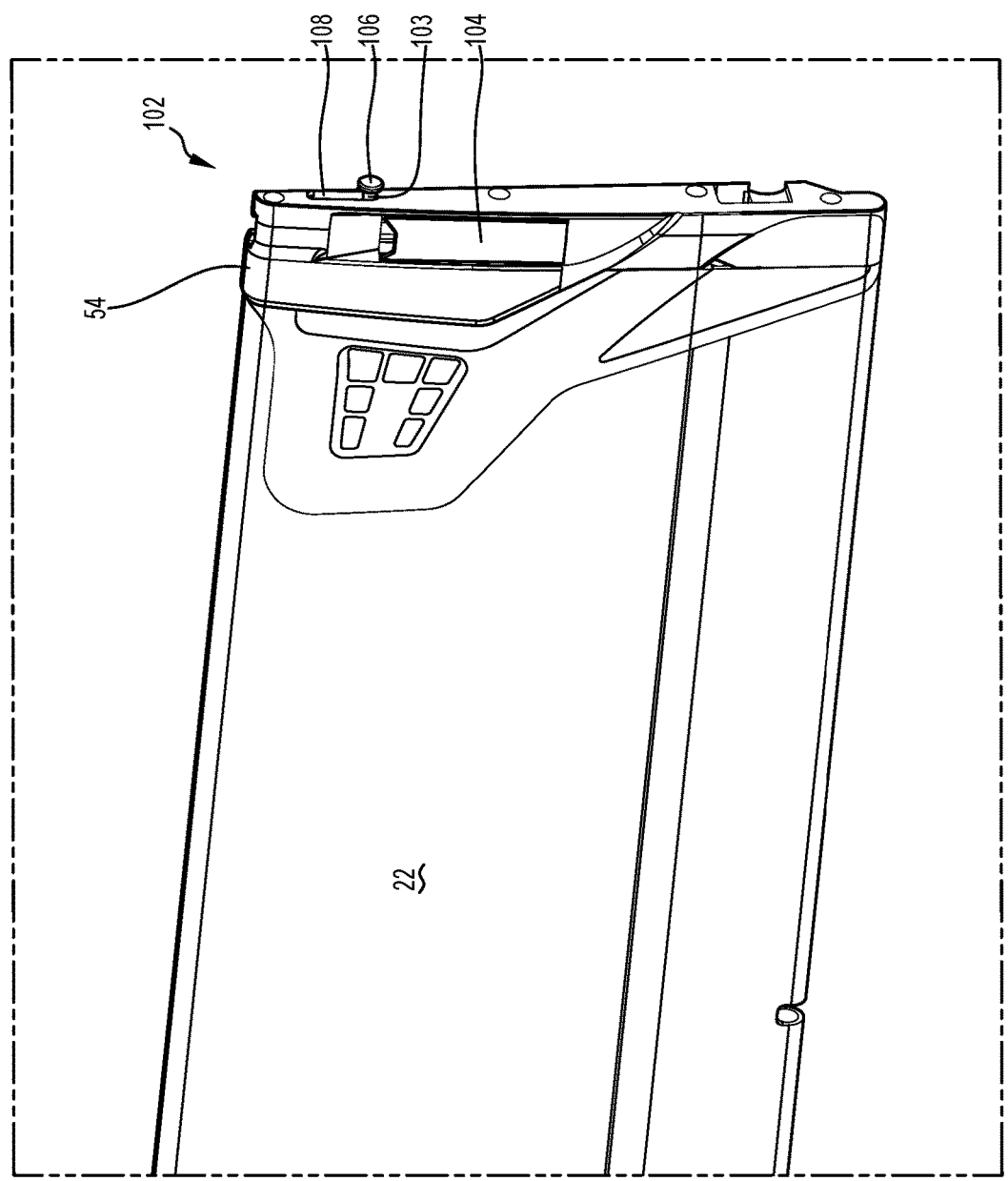
FIG. 13 is a rear-right-side perspective view of a utility tray rear gate (in this embodiment, comprising a first gate), along with a first part of the right corner module in accordance with an embodiment of the present invention.

FIG. 13 shows details of the first part 54 of the corner module 32, which is joined at a right end of the rear (first) gate 22 of the utility tray 12. Perhaps more clearly shown in FIG. 13 is the latch lug 106, which is located at the end of the latch protrusion 103 of the closure retention mechanism 102. The latch protrusion 103 moves up and down in a slot 108, and the movement of the latch protrusion 103 is actuated by raising and lowering of the latch handle 104.

Figure 14:
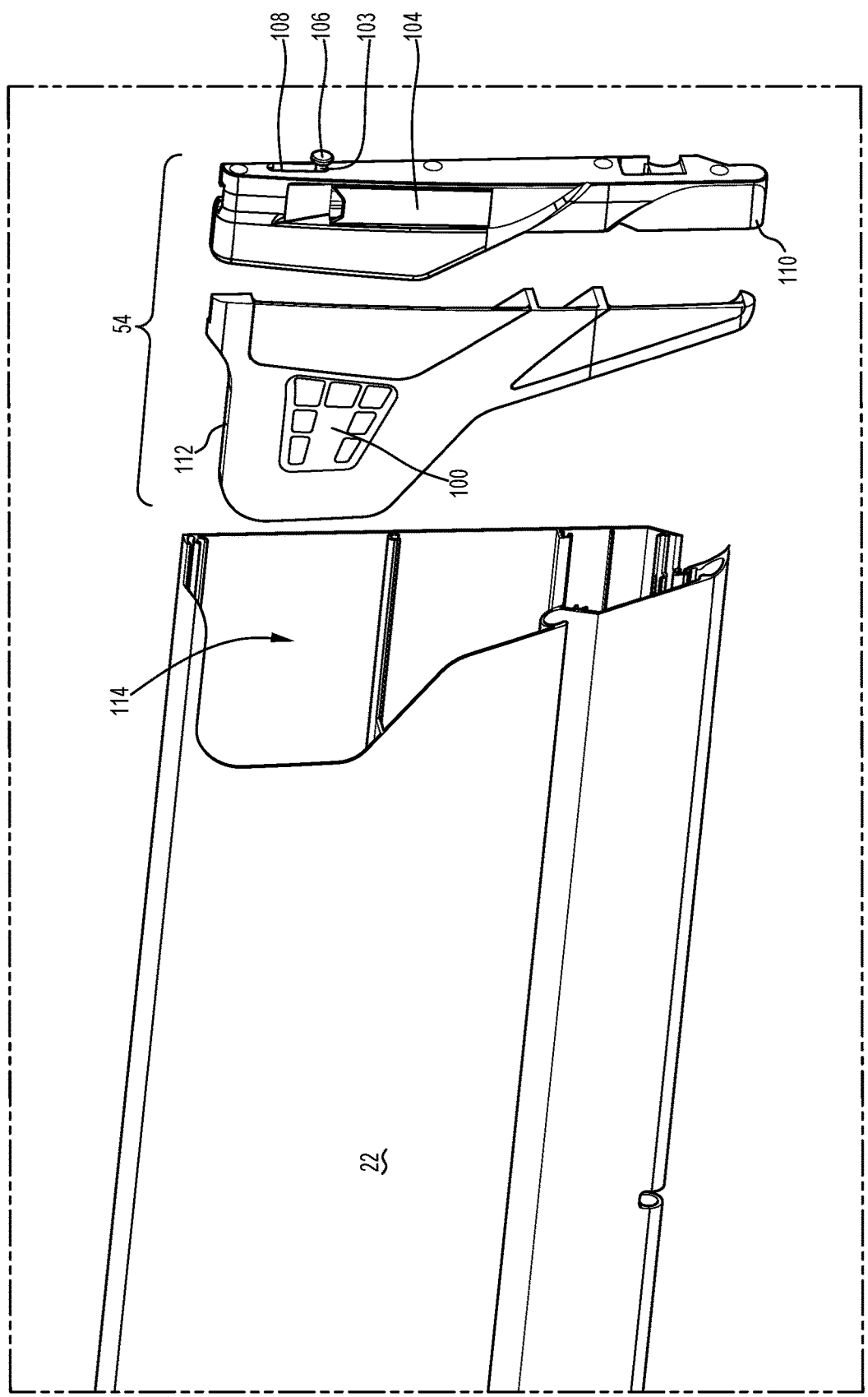
FIG. 14 is an exploded view of the utility tray rear gate and the first part of the right corner module, as shown in FIG. 13 in accordance with an embodiment of the present invention.

FIG. 14 is an exploded view of the first part 54 of the right corner module 32, showing that the first part 54 includes a first piece 110 and a second piece 112. The second piece 112 incorporates the light unit cover 100, and the first piece 110 incorporates the closure retention mechanism components of the first part 54.

FIG. 14 also depicts more clearly a space 114 resulting from the curvature of the gate 22 and the first part 54 (or the first part second piece 112). The space 114, in this embodiment, is formed between the surface of the second piece 112 and the inner surface of the gate 22, being the surface of the first gate 22 facing inwardly to the utility tray 12, when the gate is in a closed position. A light unit may be accommodated within the space 114, with the lights protected by the light unit cover 100.

It will be appreciated that a number of other components could be fitted within the space 114, or within the space between the outer and inner surfaces of the first gate 22, formed as a result of the curvature of at least one of those surfaces (in this embodiment, the outer surface), and that curvature allowed for by provision of the corner module 32. Such other components may include reversing cameras, extra light units, proximity detectors, and many other types of electrical, electronic, electromechanical, and/or mechanical components.

Figure 15:
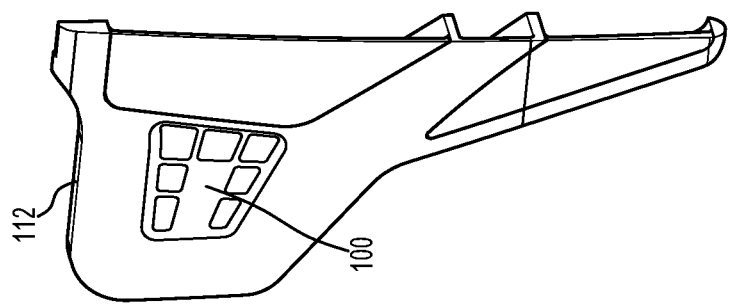
FIG. 15 is a rear-right-side perspective view of a first piece of the first part of the right corner module, incorporating a light unit in accordance with an embodiment of the present invention.

FIG. 15 is a detailed view of the second piece 112 of the first part 54, perhaps more clearly showing curvature of the piece with respect to a vertical plane. In embodiments, the second piece 112 may also include curvature with respect to a horizontal plane.

Figure 16:
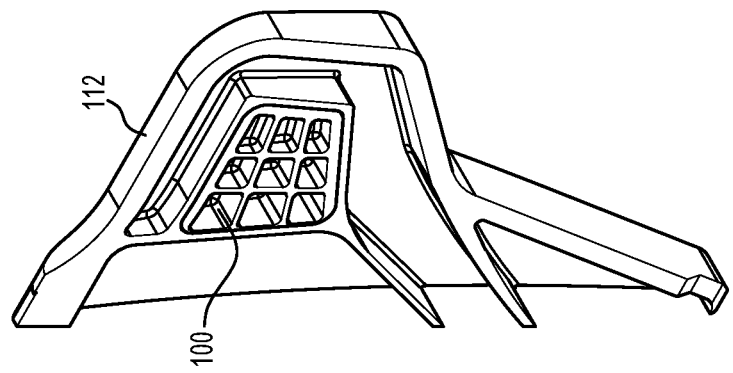
FIG. 16 is a front-left-side perspective view of the first piece, as shown in FIG. 15 in accordance with an embodiment of the present invention.

FIG. 16 show a reverse view of that shown in FIG. 15. The vertical curvature of the second piece is depicted with the second piece being generally thinner toward the top thereof and thicker towards the bottom thereof.

Figure 17:
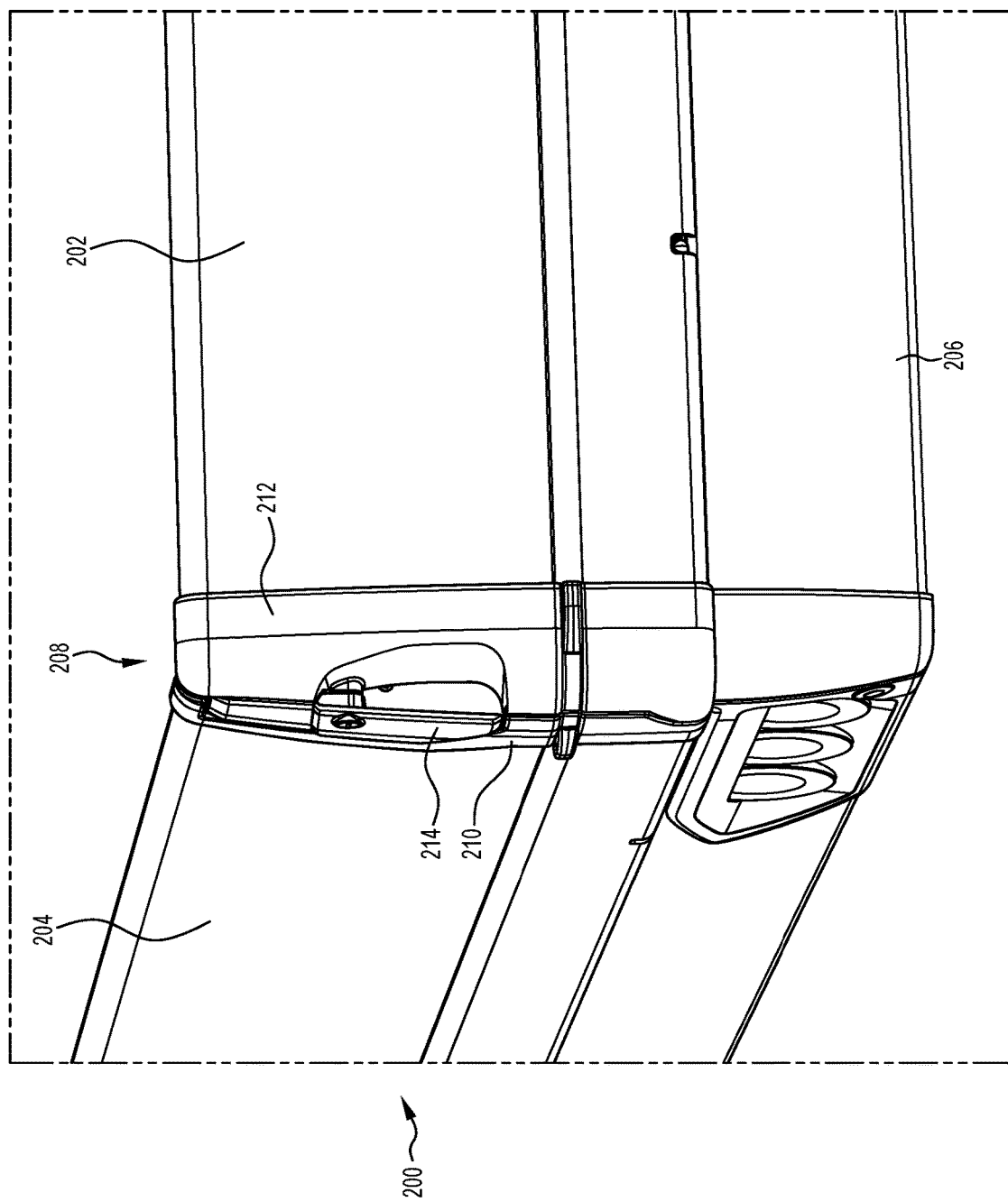
FIG. 17 is a perspective view of gate securing apparatus of a utility vehicle tray deck securing a first side gate (a right-side gate from a rear view of the utility vehicle) and a second side gate (a rear-side gate of the utility vehicle) in a closed configuration in accordance with an embodiment of the present invention.

FIG. 17 shows two side gates of a utility vehicle tray deck 200, where the side gates are hingedly mounted to the deck 206 of the tray deck. Depicted is a rear side gate 204 and a right-side gate 202 (which is on the right when looking at the utility vehicle from a rearward perspective). The side gates are secured together in a closed position by gate securing apparatus 208.

For consistency and clarity, in this specification the right-side gate will serve to demonstrate the first gate according to the statements of invention, and the rear side gate will serve to demonstrate the second gate according to the statements of invention. However, it will be appreciated that this nomenclature is a matter of convenience for the description of embodiments of the invention, and is not intended to be limiting. It will also be appreciated that the invention can be configured so as to be used to secure many different gate types, and is not limited to securing utility vehicle tray deck side gates.

FIG. 17 shows external components of the example gate securing apparatus 208 including cover 210, which is located on the rear side gate 204, and cover 212, which is located on the right-side gate 202. Also shown is a handle 214 on the rear side gate, the handle for manually operating the gate securing apparatus.

Figure 18:
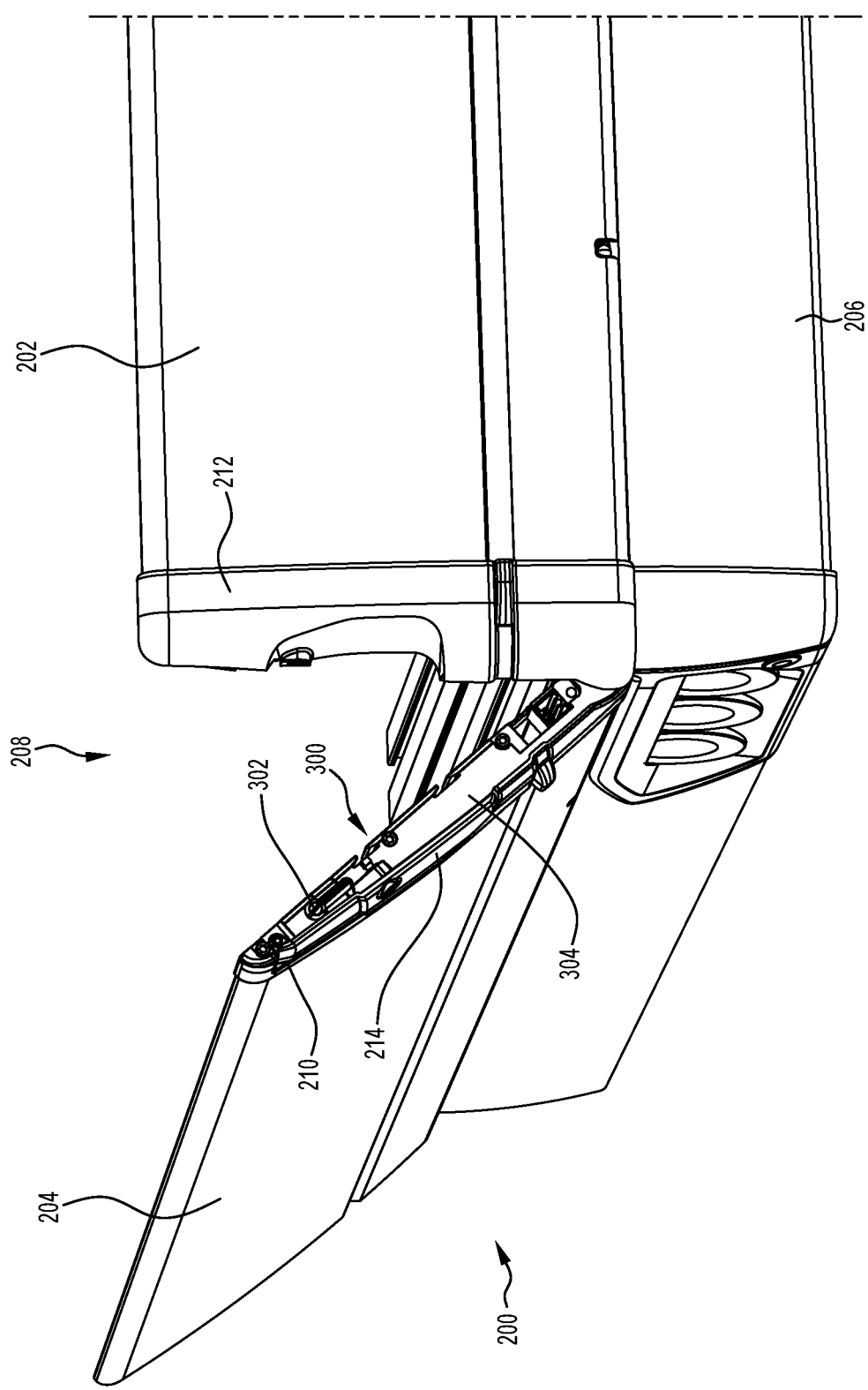
FIG. 18 is a perspective view of gate securing apparatus of a utility vehicle tray deck with the first side gate disengaged from the second side gate, and the second side gate opening in accordance with an embodiment of the present invention.

FIG. 18 shows the rear side gate 204 opening and being rotated downwardly. In order for the rear side gate to be opening the gate securing apparatus 208 is operated to release the gates 202 and 204 from each other. In this example, the right-side gate remains in its upright position, and may be secured at its other end (not shown) by other gate securing apparatus to, for example, a front side gate or a non-moving front side of the tray deck 200.

In FIG. 18 it is possible to see parts of the mechanism 300 of the gate securing apparatus located on the rear side gate 204, including a reciprocating pin 302. The rear side gate mechanism 300 is mostly covered by a side 304 of the cover 210.

Figure 19:
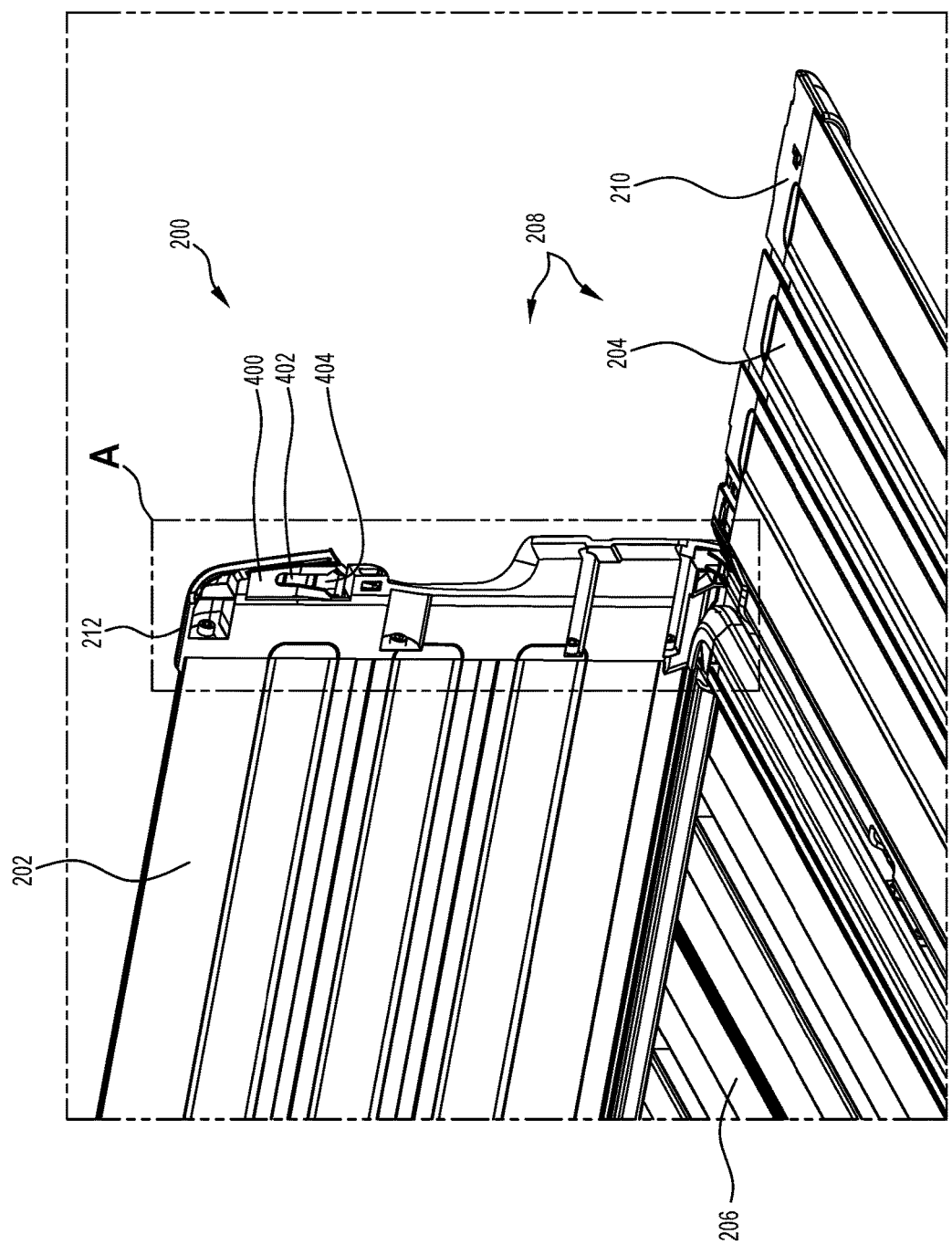
FIG. 19 is a perspective view, at a different angle from FIGS. 17 and 18, of gate securing apparatus of a utility vehicle tray deck with the first side gate disengaged from the second side gate, and the second side gate fully open in accordance with an embodiment of the present invention.

FIG. 19 shows the rear side gate 204 in a horizontal position, with the right-side gate 202 in an upright position. Within the rectangle A (included only for picturing purposes), can be seen the cover 212, which is fixed to the right-side gate, and a slot plate 400, which is fixed to the cover 212. The slot plate 400 has an open slot 402, with its opening 404 at the lower end of the open slot 402 (when the right-side gate is in an upright position). It will be recognized that the reciprocating pin 302 moves into and out of the open slot 402 to, respectively, secure the side gates together and release the side gates from each other.

Figure 20:
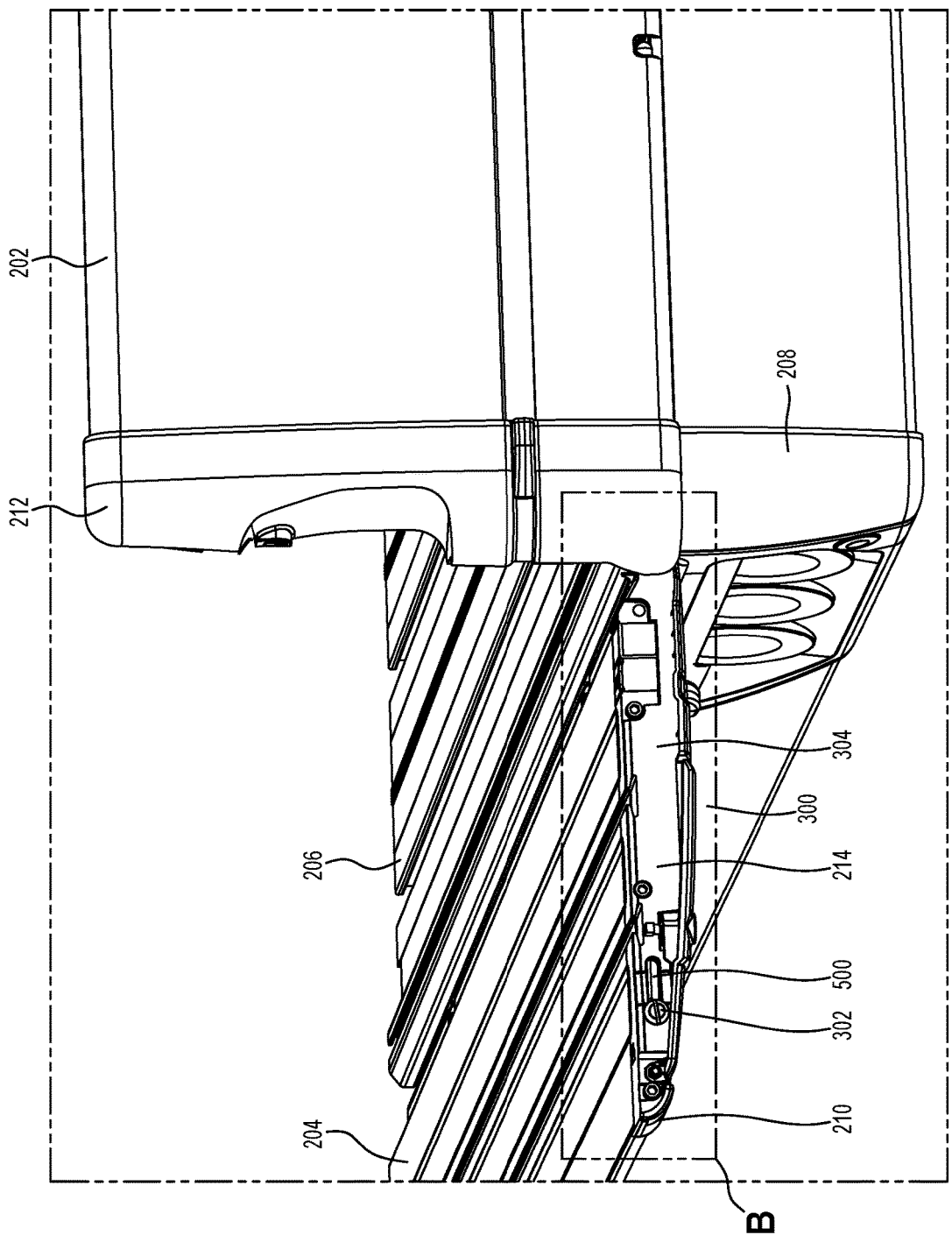
FIG. 20 is a perspective view, at the same angle as FIGS. 17 and 18, of gate securing apparatus of a utility vehicle tray deck with the first side gate disengaged from the second side gate, and the second side gate fully open in accordance with an embodiment of the present invention.

FIG. 20, similarly to FIG. 19, shows the rear side gate 204 in a horizontal position, with the right-side gate 202 in an upright position. Within the rectangle B (included only for picturing purposes), can be seen the cover 210, which is fixed to the rear side gate. The reciprocating pin 302 moves in a pin slot 500 located in the side 304 of the cover 210.

Figure 21:
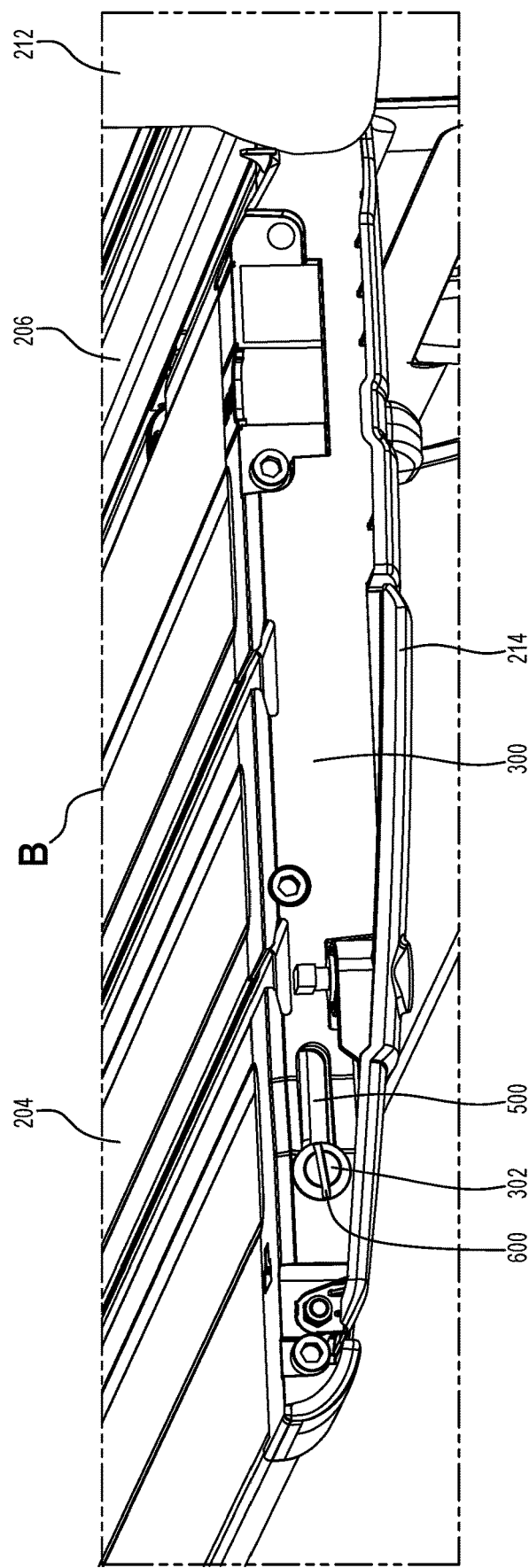
FIG. 21 is a detail from FIG. 20 in accordance with an embodiment of the present invention.

FIG. 21 shows details from rectangle B of FIG. 20. The reciprocating pin 302 has a groove 600 so that a flat blade screw driver can be used to screw the pin into and out of a reciprocating carriage (described later in this specification). The length of travel allowed by pin slot 500 is sufficient that the reciprocating pin 302 is able to move out sufficiently past the opening 404 of the open slot 402, such that the gate securing apparatus 208 is released, and so that the gates 202, 204 can be moved apart from each other to be opened.

Figure 22:
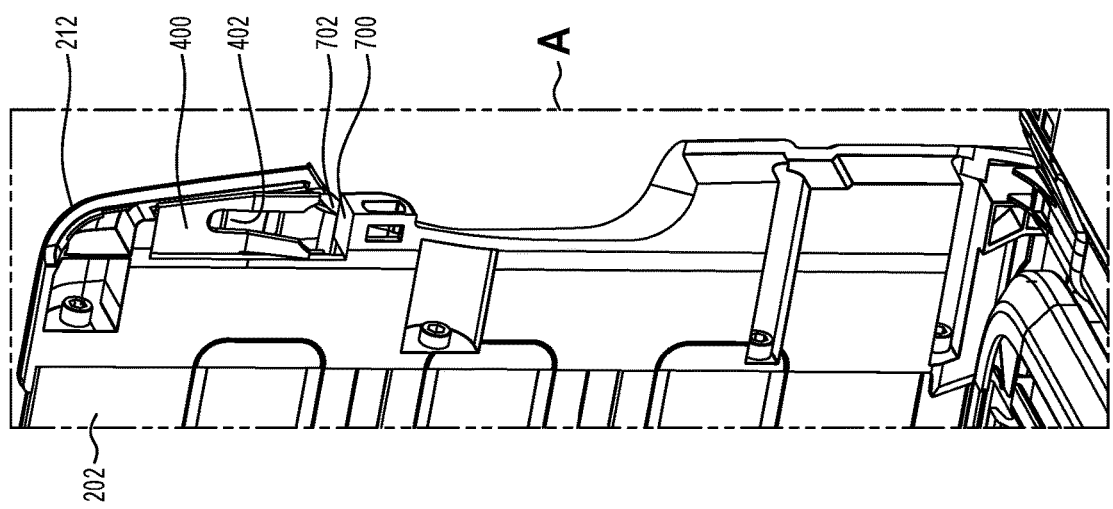
FIG. 22 is a detail from FIG. 19 in accordance with an embodiment of the present invention.

FIG. 22 shows details from rectangle A of FIG. 19. It can be seen that the cover 212 of the right-side gate 202 is shaped so that the reciprocating pin 302, when moving out of the opening 404 of the open slot 402 moves into a space 700 (depicted in FIG. 22 below the open slot), and through an opening 702 at the rear of the cover 212 (as depicted in in FIG. 22). This arrangement allows the reciprocating pin to completely disengage from the plate 400, and thus the side gates can be released from each other.

Figure 23:
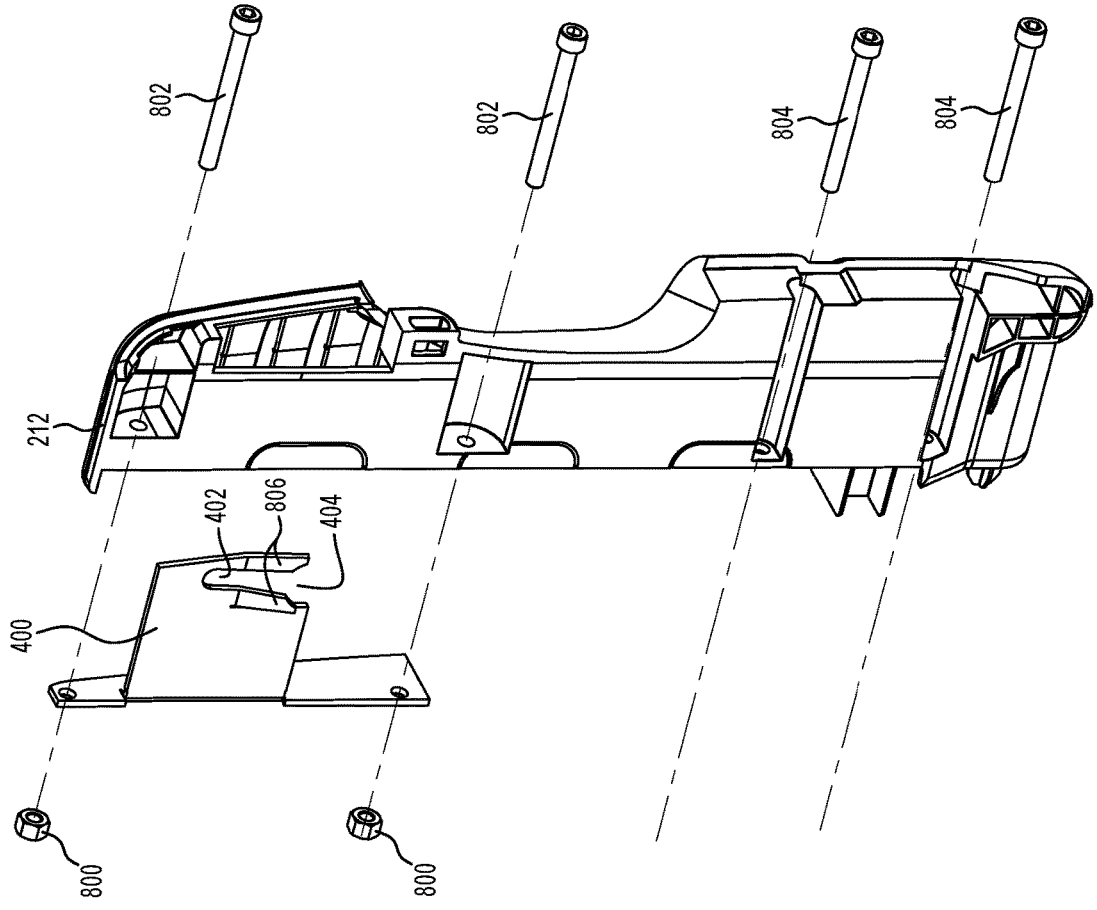
FIG. 23 is an exploded perspective view from FIG. 22 of part of the gate securing apparatus with the open slot on the first side gate in accordance with an embodiment of the present invention.

FIG. 23 shows details from FIG. 22 in exploded view. The slot plate 400 is secured to the cover 212 and to the right-side gate 202 with a nut 800 and bolt 802 arrangement. The cover 212 is further secured to the right-side gate with bolts 804.

The open slot 402 in the slot plate 400 has two slot sides 806, which are angled away from the slot plate (which is towards the reciprocating pin 302 when both the rear side gate 204 and right-side gate 202 are in their upright positions). The slot sides 806 are tapered outwardly of the open slot 402 at its opening 404. The angled slot sides and tapering facilitate engagement and release of the reciprocating pin 302 into and out of the open slot 402.

Figure 24:
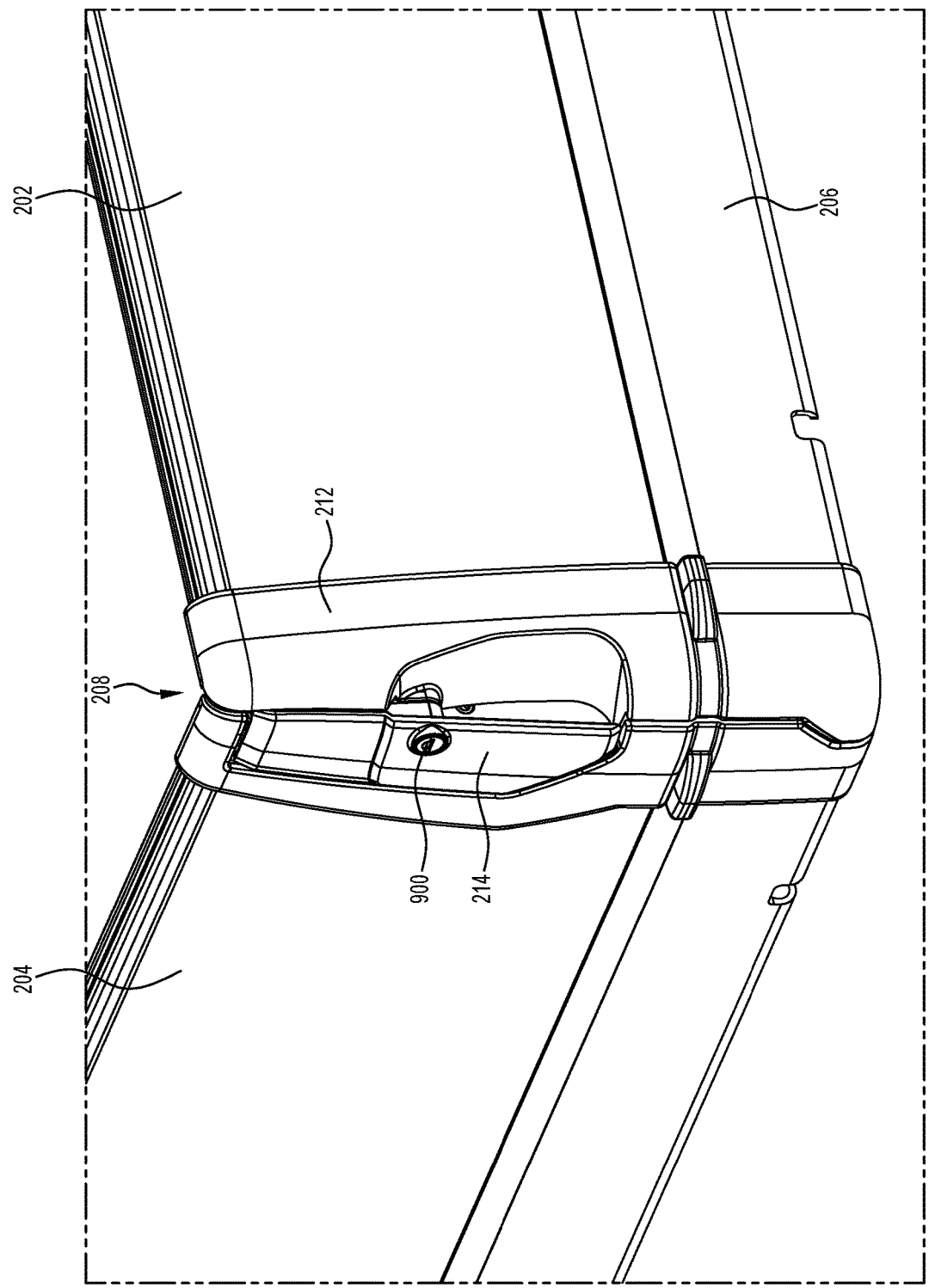
FIG. 24 is a similar view to FIG. 17 in accordance with an embodiment of the present invention.

FIG. 24 is a similar view to that shown in FIG. 17, but without the deck 206 of the tray deck 200. In FIG. 24, it is shown that the gate securing apparatus 208 also includes a locking mechanism 900, incorporated into the handle 214. The locking mechanism, when locked, secures the handle in its closed position, against the mechanism 300 of the gate securing apparatus located on the rear side gate. 204. In this embodiment, the locking mechanism 900 is a rotating key-operated lock. When the gate securing apparatus secures the gates in a closed position, the locking mechanism provides security to stop unauthorized people from opening the side gates.

Figure 25:
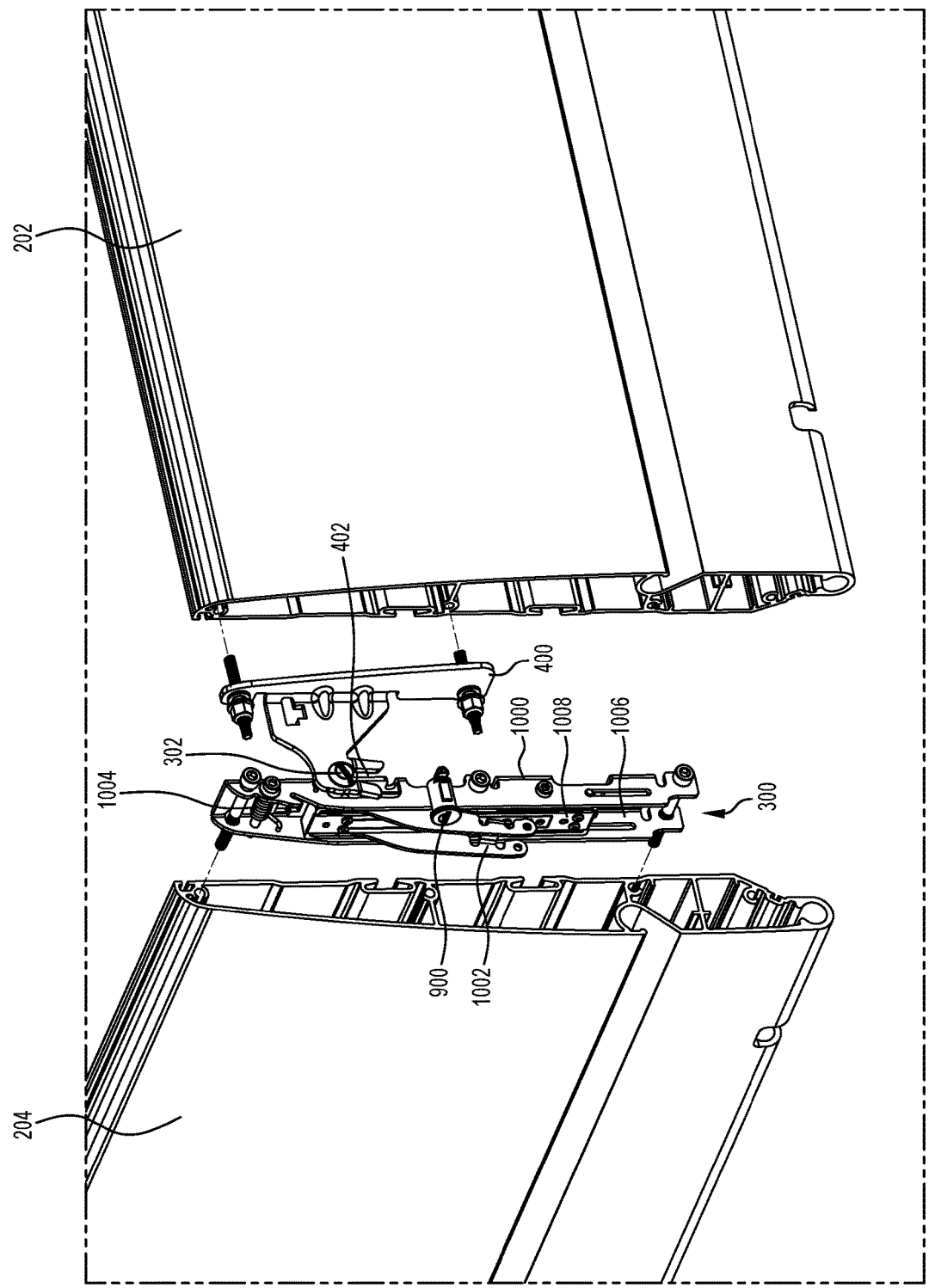
FIG. 25 is a partially-exploded view of FIG. 24 in accordance with an embodiment of the present invention.

FIG. 25 shows internal operating components of the mechanism 300, including a frame 1000 having a carriage slot 1006 in which the reciprocating carriage 1008 moves back and forth. Also shown is a lever mechanism 1002, with a lever arm which is rotatably connected at one end to the reciprocating carriage 1008, and which is rotatably connected at its other end to the handle 214 (not shown). Operation of the handle by pulling it outwardly causes the lever arm to move the reciprocating carriage downwardly in the carriage slot 1006, which, in turn, causes the reciprocating pin 302 to move downwardly (described relative to the rear side gate when it is in its upright position). This will, in turn, cause the reciprocating pin 302 to move out from and disengage from the open slot 402, thus allowing one or both the gates to be opened. Operation of the handle by pushing it inwardly causes the lever arm to move the reciprocating carriage upwardly in the carriage slot 1006, which, in turn, causes the reciprocating pin 302 to move upwardly. This will, in turn, cause the reciprocating pin 302 to engage into the open slot 402 when the rear side gate 204 and right-side gate 202 are both closed in their upright positions and aligned sufficiently to allow the reciprocating pin to move into the opening 404 of the open slot.

The mechanism 300 also includes a coiled spring 1004, which operates to bias the handle 214 towards a closed position, which, in turn, biases the reciprocating carriage 1008 to the upward position in its carriage slot 1006 (described relative to the rear side gate when it is in its upright position). The coiled spring thus acts as a bias to keep the gate securing apparatus 208 engaged securing the side gates together when both are in their upright positions.

Figure 26:
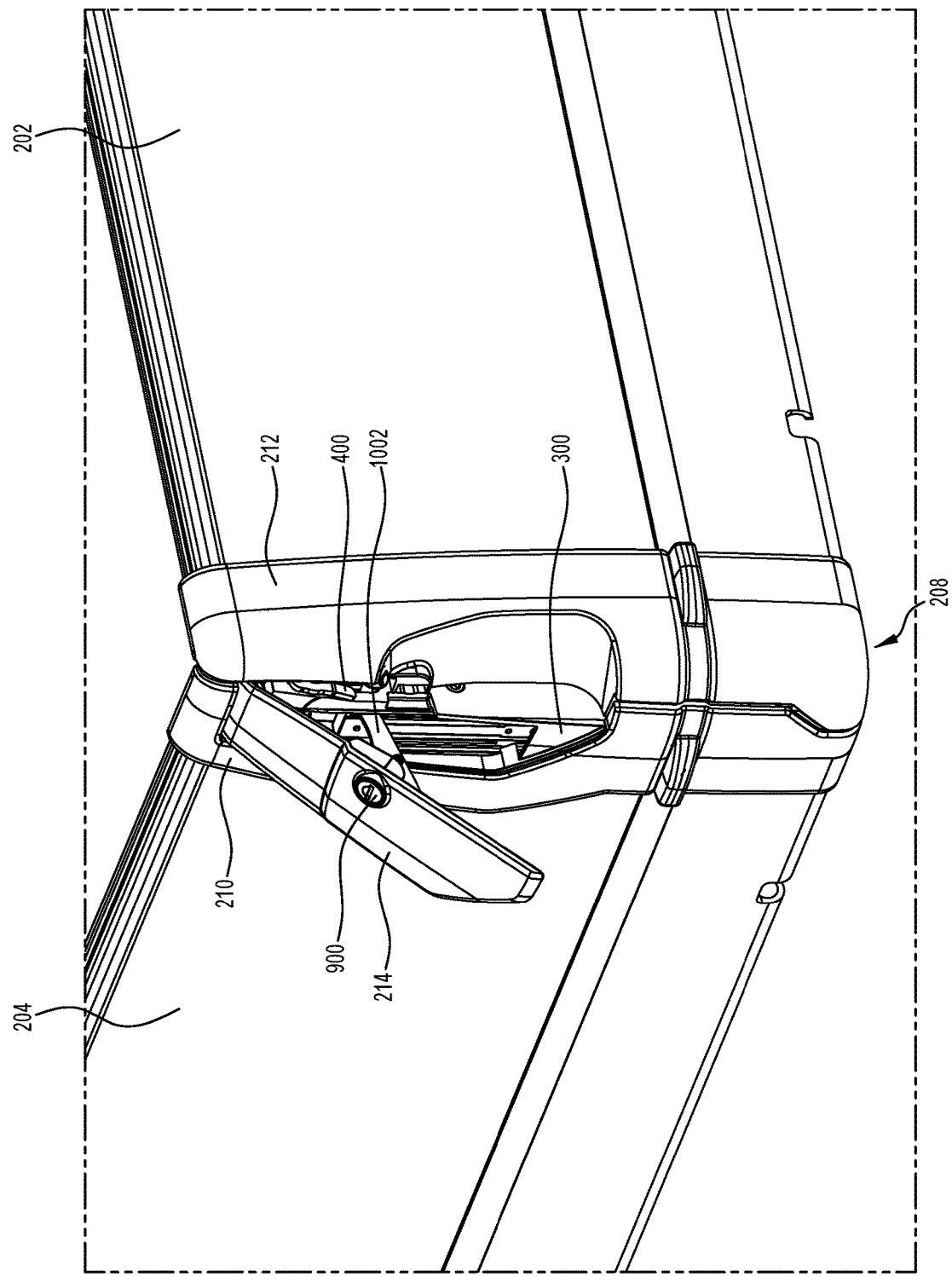
FIG. 26 is a similar view to FIG. 24, with the hinged latch handle of the gate securing apparatus in a side gate opening position (end of travel of the second handle direction) in accordance with an embodiment of the present invention.

FIG. 26 is a similar view to FIG. 24, with the handle 214 moved outwardly, which causes the lever mechanism 1002 to push the reciprocating carriage 1008 and reciprocating pin 302 downwardly (as depicted), thus disengaging the reciprocating pin from the open slot 402, and allowing the rear side gate 204 and right-side gate 202 to be moved away from each other.

Figure 27:
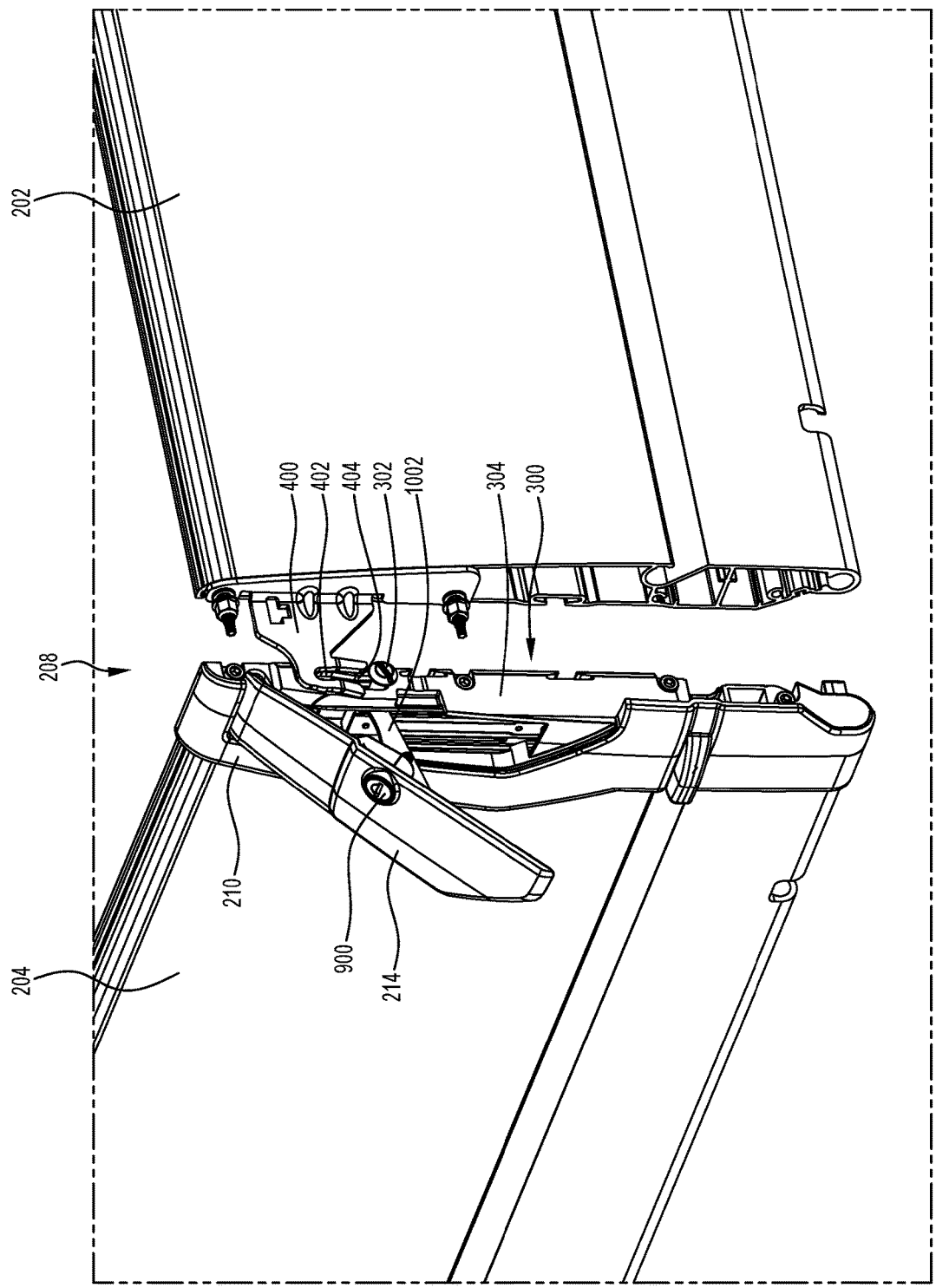
FIG. 27 is a partially-exploded vie of FIG. 26 in accordance with an embodiment of the present invention.

FIG. 27 is a similar view to FIG. 26, in which the right-side gate 202 and rear side gate 204 are shown out of their typical positions, and cover 212 is removed, to allow a clearer view of the reciprocating pin 302 disengaged from the open slot 402 when the handle 214 is move outwardly or away from of the rear side gate.

Figure 28:
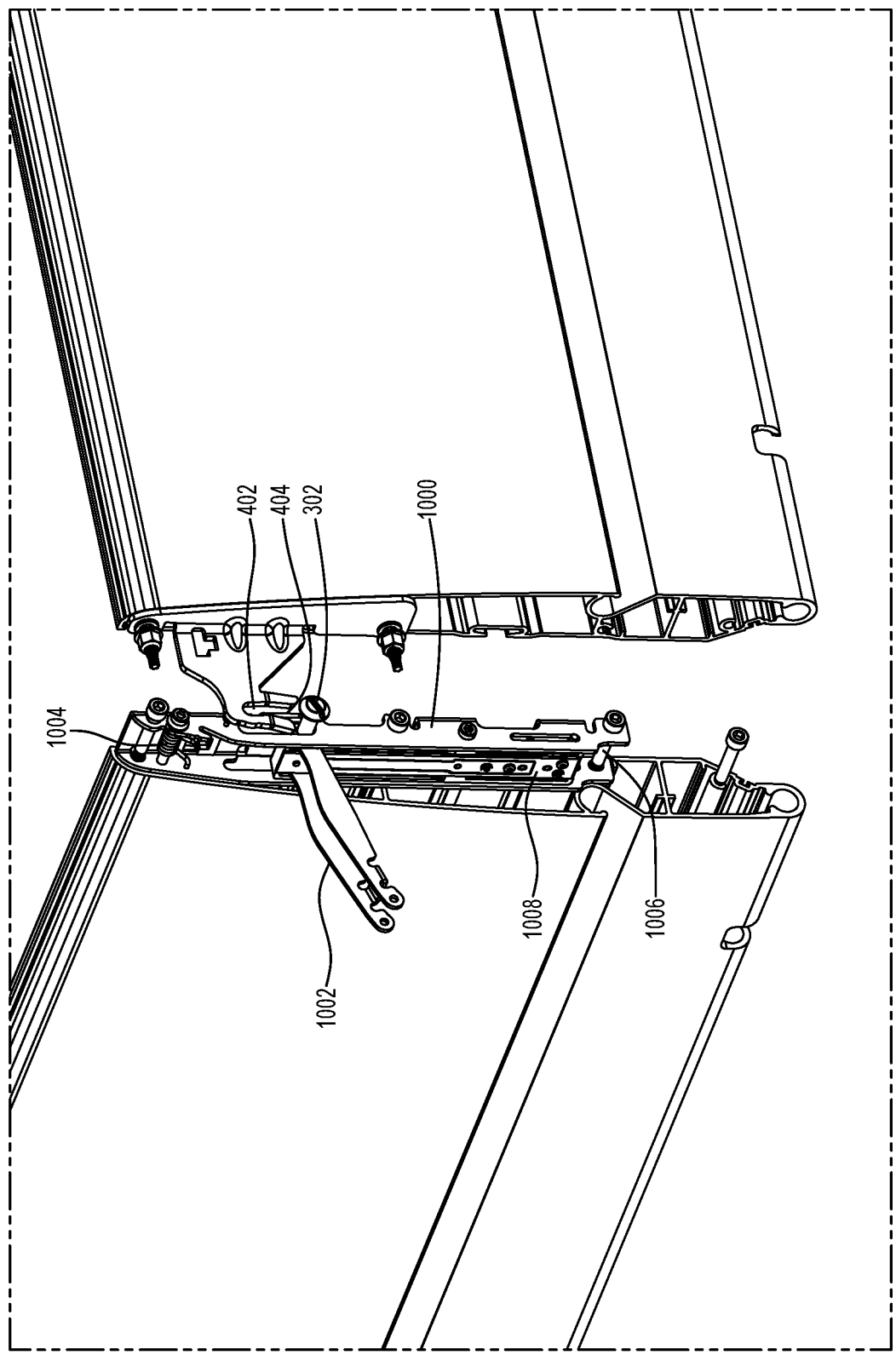
FIG. 28 is a similar view to FIG. 27 with covers removed from the gate securing apparatus for easier viewing of internal components thereof in accordance with an embodiment of the present invention.

FIG. 28 is a similar view to FIG. 27, with the handle 214 removed to more clearly view the lever mechanism 1002, which, by operation of the handle, has pushed the reciprocating carriage 1008 to a lower end position (as depicted) in carriage slot 1006.

Figure 29:
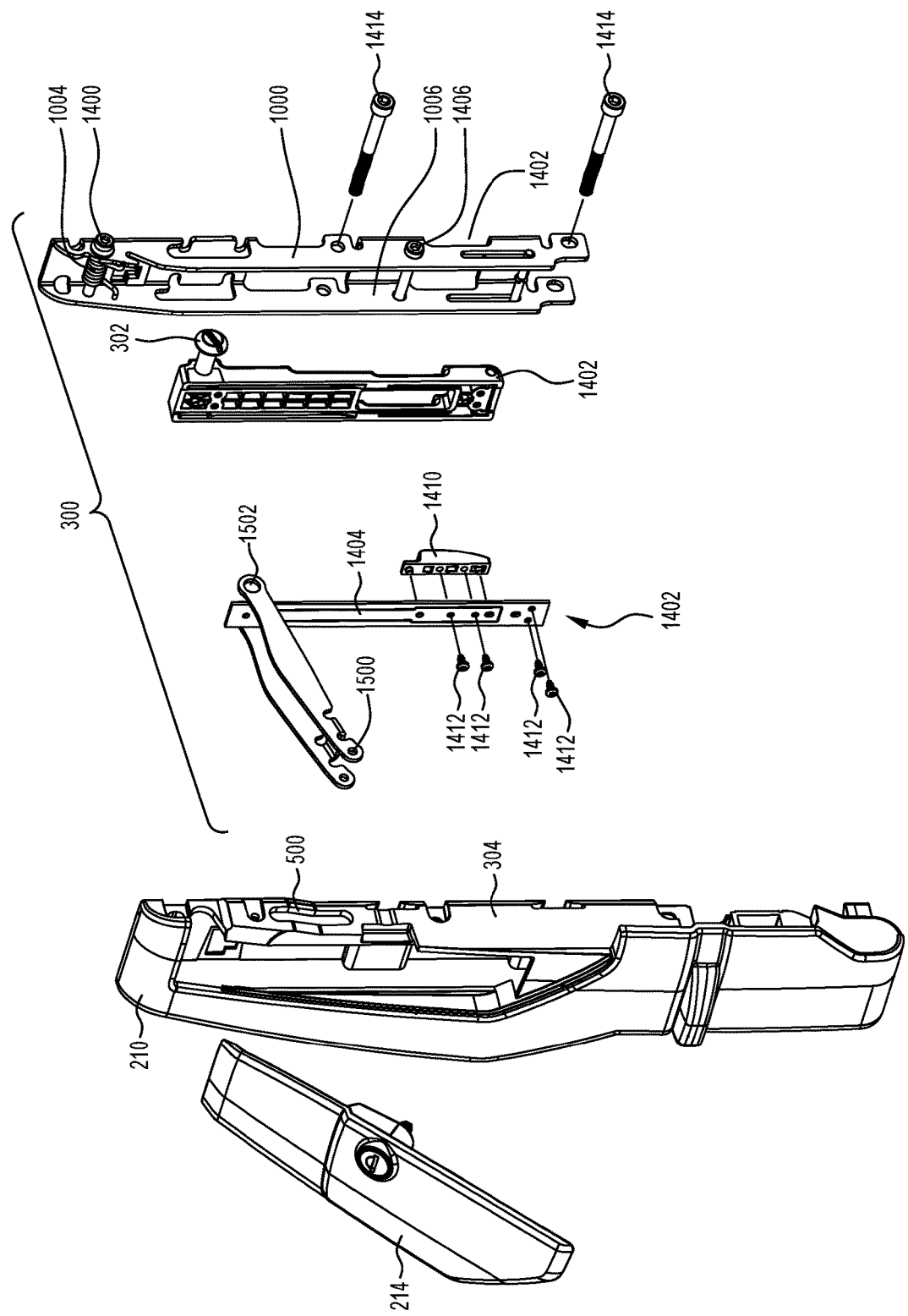
FIG. 29 is an exploded perspective view of the gate securing apparatus in accordance with an embodiment of the present invention.

FIG. 29 shows an exploded view of the rear side gate apparatus cover 210, the handle 214 and details of the rear side gate mechanism 300 (the internal mechanism of this part of the gate securing apparatus 208). The coils spring biasing means 1004 is mounted on the frame 1000 via a spring pin 1400. Also shown as part of the mechanism 300 is a detent means 1402, including a leaf spring 1404 with a detent lug 1410, which is configured to engage with and disengage from a detent pin 1406 located across the carriage slot 1006 on frame 1000 to cause a detent action. The detent lug is fixed to the spring via screws 1412.

The detent action causes the reciprocating carriage 1008 to be held by a small but sufficient force in a lower end position (as depicted) in carriage slot 1006. This detent action, in turn, causes the handle 214 to remain in its outwardly protruding position via action of the lever mechanism 1002. The detent action also causes the reciprocating pin 302 to be in a lower end position (as depicted) in pin slot 500. The detent action may lead to more efficient operation of the gate securing apparatus, as a user does not need to pull the handle 214 when, for example, closing the gates after the gates have been opened, as the detent action will retain the apparatus in its open configuration with the reciprocating pin able to re-engage into the open slot 402.

FIG. 29 (with reference to FIG. 30) also shows holes at the ends of the lever arm in the lever mechanism 1002. The holes 1500 are rotatably fixed to the handle 214, approximately halfway along the handle. The holes 1502 are rotatably fixed to the reciprocating carriage 1008, and the axis of rotation is coaxial with the longitudinal axis of the reciprocating pin 302. Also shown in FIG. 29 are bolts 1414 for securing the internal mechanism 300 (via the frame 1000) to the rear side gate 204. The bolts also cause the cover 210 to be secured to the rear side gate.

Figure 30:
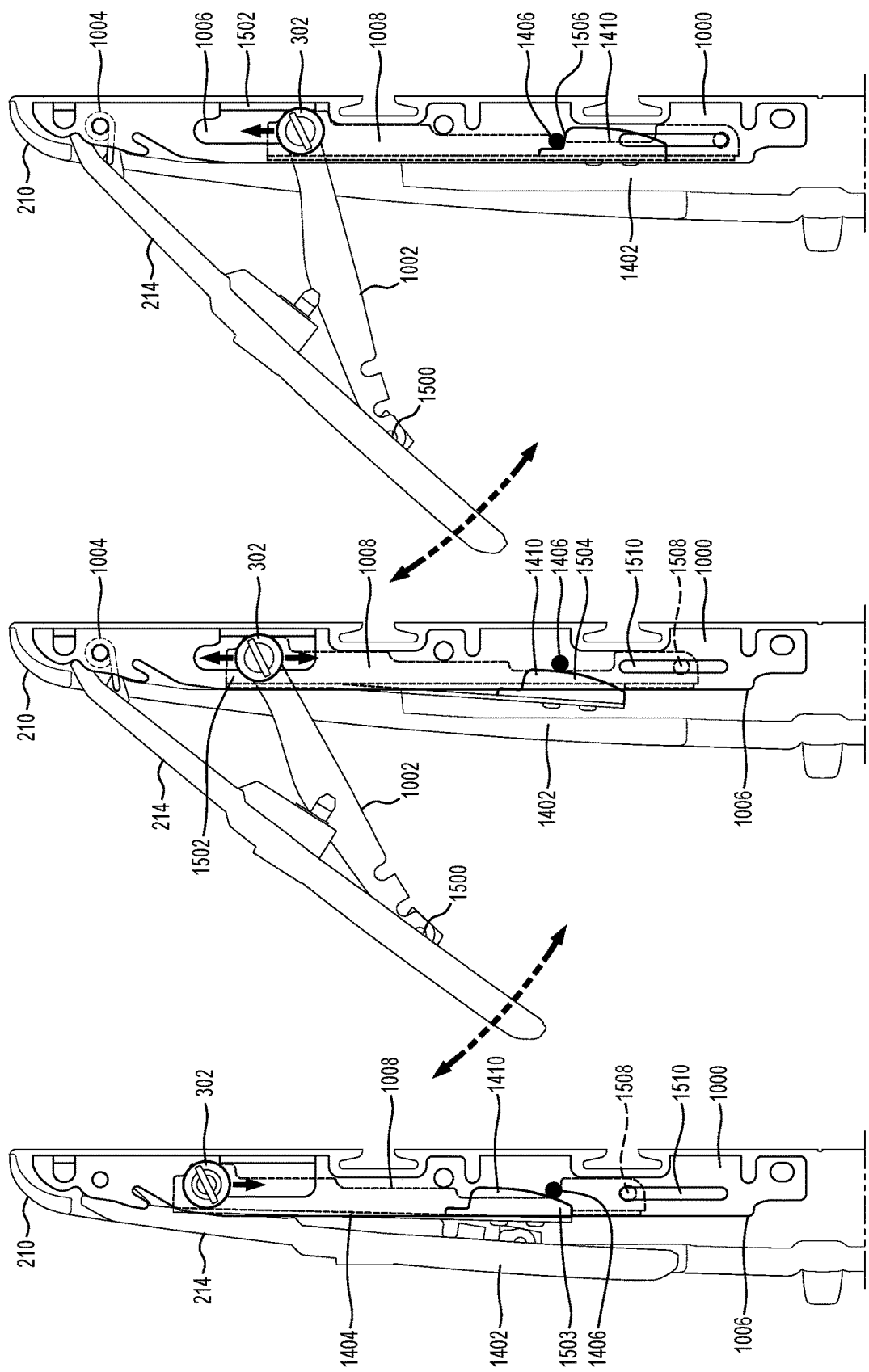
FIG. 30 is a series of side elevation views depicting operation of a latch of the gate securing apparatus in accordance with an embodiment of the present invention.

FIG. 30 shows stages in a detent action of the detent means 1402. In the left-most drawing, the gate securing apparatus 208 is in a closed position with the handle 214 against the cover 210. A lower part 1503 (as depicted) of the detent lug 1410 is resting against detent pin 1406, and, due to the shape of the detent lug, the detent spring 1404 is unflexed (or relatively lowly flexed). In the middle drawing, the handle 214 is pulled outwardly, away from the cover 210, causing the reciprocating carriage 1008 to travel downwardly (as depicted) in the carriage slot 1006. The detent lug also moves downwardly and a middle part of the lug 1504 presses against the detent pin, which, due to the shape of the lug, causes the detent spring to flex, thus increasing its tension and increasing the force of the detent lug against the detent pin. This force causes a small resistance to the movement of the reciprocating carriage towards the downward position. In the right-most drawing, the handle 214 is fully moved outwardly from the cover 210, wherein an upper part 1506 (as depicted) of the detent lug 1410 moves over the detent pin 1406, and the lug is shaped to allow the detent spring to move back to be unflexed (or relatively lowly flexed), and thus cause a small detent force against the movement of the reciprocating carriage towards its upper position in the carriage slot 1006, thus the reciprocating carriage is held by detent at its lower position in the slot 1006. The small detent force can be readily overcome by manual operation of the handle, wherein it is pushed towards the cover 210, thus causing a reversal of the detent action depicted in FIG. 30, and the reciprocating carriage is able to move towards its upper position (as depicted) in the carriage slot, a movement which is biased by the spring 1004. It will be appreciated that the force produced by the detent means 1502 and the force produced by the biasing spring 1004 must be balanced to allow the detent action to operate.

Figure 31:
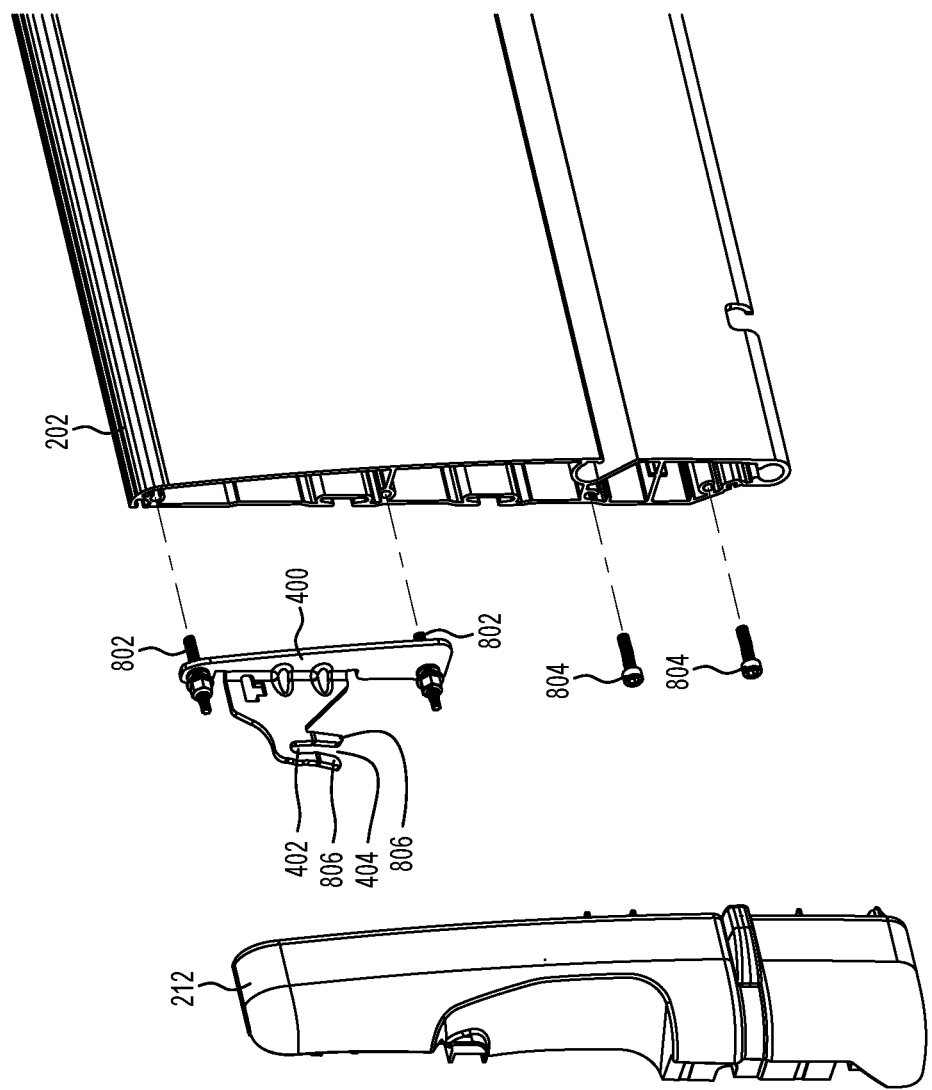
FIG. 31 is a partially-exploded view showing details of the slot plate and right-side gate cover in accordance with an embodiment of the present invention; and, FIG. 32 is an exploded view of components of the gate securing apparatus in accordance with an embodiment of the present invention.

FIG. 31 shows details of the slot plate 400 and right-side gate cover 212 from a different view.

Figure 32:
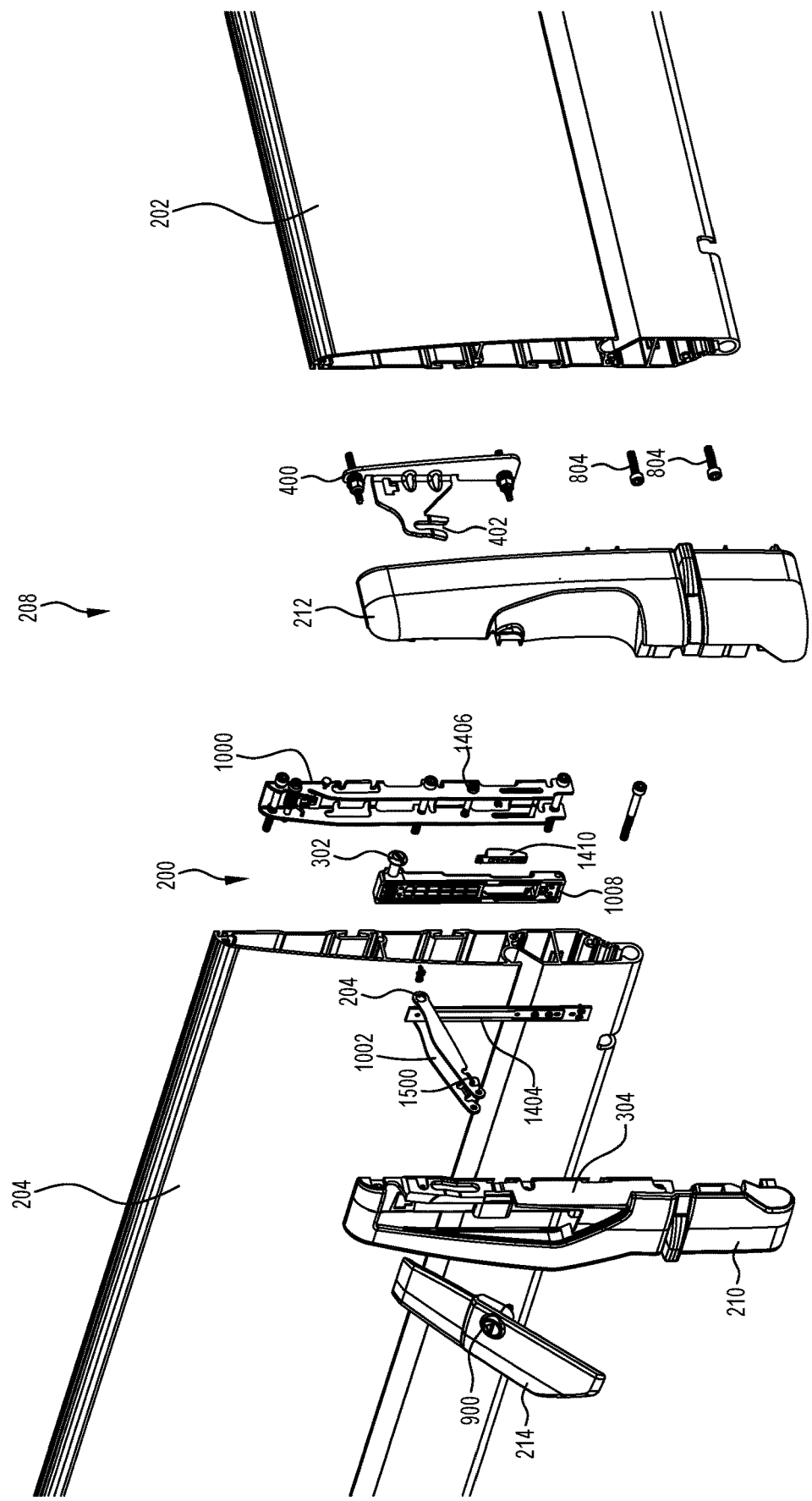

FIG. 32 is an exploded view of components of the gate securing apparatus 208, as described with reference to earlier figures.

The present invention has been described with embodiments exemplified for orthogonally positioned side gate of a utility vehicle, however, it will be appreciated that the gate securing apparatus, system and method can be used in many other applications. The apparatus, system and method can also be applied to a single moving gate, which closes (latches or otherwise secures) to, for example, a post or a wall. The gate securing apparatus, system and method can also be used for other objects which need closing, such as doors or windows.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not and should not be taken as an acknowledgement or any form of suggestion that the prior art forms part of the common general knowledge.

The invention claimed is:

1. A corner module, comprising a first part adapted, in use, to join at an end of a first elongate and hinged gate of a utility vehicle tray, a second part adapted, in use, to join at an end of a second elongate and hinged gate of the utility vehicle tray, and a releasable gate securing apparatus comprising complementary engagement sections in the first part and in the second part, such that, in use, when the first and second gates are moved towards a closed position, the gates define a corner, and the releasable gate securing apparatus sections are enabled to engage to releasably retain the first and second parts in the closed position, wherein at least one of the first part and the second part has an outer face external to the corner in the closed position, wherein the outer face is curved, and wherein the defined corner is curved.

2. A corner module according to claim 1, wherein the outer face of each of the first and second parts is curved with respect to at least one plane.

3. A corner module according to claim 2, wherein the outer face of the first part is curved with respect to at least one plane, and the outer face of the second part is curved with respect to at least two planes.

4. A corner module according to claim 3, wherein the outer face of the first part is curved with respect to at least two planes.

5. A corner module according to claim 2, wherein the outer face of the first part is curved so as to match or substantially match curvature of the first gate in at least one plane.

6. A corner module according to claim 5, wherein the outer face of the second part is curved so as to match or substantially match curvature of the second gate in at least one plane.

7. A corner module according to claim 1, wherein either one, or both, of the first part and the second part comprise at least one part of a light unit.

8. A corner module according to claim 7, wherein the first part has an inner face internal of the corner module when in the closed position, wherein at least a portion of the outer face of the first part is sufficiently distant from the inner face to provide a gap, such that the gap enables the first part to contain at least a portion of the light unit embedded in the first part.

9. A corner module according to claim 7, wherein the second part has an inner face internal of the corner when in the closed position, wherein at least a portion of the outer face of the second part is sufficiently distant from the inner face, such that a gap in the outer face enables the second part to contain at least a portion of the light unit embedded in the second part.

10. A corner module according to claim 7, wherein each of the first part and the second part have an inner face internal of the corner module when in the closed position, wherein at least a portion of the outer face of each of the first part and the second part is sufficiently distant from the respective inner face of each of the first part and the second part to provide gaps, such that each gap enable each of the first part and the second part to contain at least a portion of each respective at least one part of the light unit embedded in the first part and the second part.

11. A corner module according to claim 1, wherein the gate securing apparatus comprises:
a first unit capable of being fastened to a first gate, the first unit comprising a first engagement part;
a second unit capable of being fastened to a second gate, the second unit comprising:
a reciprocating carriage comprising a second engagement part, wherein, when the carriage moves in a first carriage direction, the second engagement part engages with the first engagement part, and when the carriage moves in a second carriage direction, the second engagement part disengages from the first engagement part;
a hinged latch handle operably connected to the reciprocating carriage by a lever mechanism, such that when a free end of hinged latch handle is moved in a first handle direction, the reciprocating carriage is caused to move in the first carriage direction, and when the free end of hinged latch handle is moved in a second handle direction, the reciprocating carriage is caused to move in the second carriage direction;

wherein, when the first unit and second unit are upright and secured together, the first (engaging) carriage direction is orientated substantially downward and the second (disengaging) carriage direction is orientated a substantially upward, such that the carriage would need to move upwards against gravity to disengage the engagement parts;

and wherein, when the second unit is upright, the free end of the hinged latch handle is located below the hinge of the latch handle, and the first handle direction is away the rest of the second unit; such that the free end of the handle would need be raised against gravity to cause the reciprocating carriage to move in the second (disengaging) carriage direction.

12. A corner module according to claim 11, wherein the reciprocating carriage is located within the second unit.

13. A corner module according to claim 11, wherein the hinged latch handle lever mechanism is located within the second unit, and the hinged latch handle does not significant protrude from the surface of second unit when the handle has been moved in the second handle direction.

14. A corner module according to claim 11, wherein the gate securing apparatus comprises an operable lock capable restraining motion of the handle or the reciprocating carriage when in the locked state; and wherein the lock mechanism is substantially located within a unit.

15. A corner module according to claim 11, wherein the first unit is fastened to a first gate and/or the second unit is fastened to a second gate.

* * * * *